US006548587B1

(12) United States Patent
Bagrodia et al.

(10) Patent No.: US 6,548,587 B1
(45) Date of Patent: *Apr. 15, 2003

(54) POLYAMIDE COMPOSITION COMPRISING A LAYERED CLAY MATERIAL MODIFIED WITH AN ALKOXYLATED ONIUM COMPOUND

(75) Inventors: Shriram Bagrodia, Kingsport, TN (US); John Walker Gilmer, Kingsport, TN (US); Jeffrey Todd Owens, Kingsport, TN (US); Linda Gail Bernard, Kingsport, TN (US); Sam Richard Turner, Kingsport, TN (US); James Christopher Matayabas, Jr., Chandler, AZ (US); Vasiliki Psihogios, Palatine, IL (US); Tie Lan, Lake Zurich, IL (US)

(73) Assignee: University of South Carolina Research Foundation, Columbia, SC (US)

( * ) Notice: Subject to any disclaimer, the term of this patent is extended or adjusted under 35 U.S.C. 154(b) by 25 days.

This patent is subject to a terminal disclaimer.

(21) Appl. No.: 09/593,905

(22) Filed: Jun. 14, 2000

Related U.S. Application Data

(63) Continuation-in-part of application No. 09/452,826, filed on Dec. 1, 1999, now Pat. No. 6,417,262, and a continuation-in-part of application No. 09/354,205, filed on Jul. 15, 1999
(60) Provisional application No. 60/210,064, filed on Jun. 7, 2000, provisional application No. 60/143,352, filed on Jul. 12, 1999, provisional application No. 60/111,284, filed on Dec. 7, 1998, and provisional application No. 60/111,202, filed on Dec. 7, 1998.

(51) Int. Cl.$^7$ ................................................ C08K 3/34
(52) U.S. Cl. ................... 524/445; 524/186; 501/148
(58) Field of Search .................. 524/445, 186, 524/447; 501/145, 146, 148

(56) References Cited

U.S. PATENT DOCUMENTS

| | | |
|---|---|---|
| 2,531,427 A | 11/1950 | Hauser |
| 2,737,517 A | 3/1956 | Boyd |
| 2,924,609 A | 2/1960 | Joyce |
| 2,938,914 A | 5/1960 | Joyce |
| 2,957,010 A | 10/1960 | Straley et al. |
| 2,966,506 A | 12/1960 | Jordan |
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,499,916 A | 3/1970 | Berthold |
| 3,514,498 A | 5/1970 | Okazaki et al. |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,792,969 A | 2/1974 | Gertisser |
| 3,823,169 A | 7/1974 | Staub |
| 3,843,479 A | 10/1974 | Matsunami et al. |
| 3,876,552 A | 4/1975 | Moynihan |
| 3,946,089 A | 3/1976 | Furukawa et al. |
| 4,018,746 A | 4/1977 | Brinkmann et al. |
| 4,064,112 A | 12/1977 | Rothe et al. |
| 4,071,503 A | 1/1978 | Thomas et al. |
| 4,081,496 A | 3/1978 | Finlayson |
| 4,105,578 A | 8/1978 | Finlayson et al. |
| 4,116,866 A | 9/1978 | Finlayson |
| 4,133,802 A * | 1/1979 | Hachiboshi et al. ........ 528/502 |
| 4,161,578 A | 7/1979 | Herron |
| 4,163,002 A | 7/1979 | Pohl et al. |
| 4,208,218 A | 6/1980 | Finlayson |
| 4,219,527 A | 8/1980 | Edelman et al. |
| 4,239,826 A | 12/1980 | Knott, II et al. |
| 4,391,637 A | 7/1983 | Mardis et al. |
| 4,393,007 A | 7/1983 | Priester et al. |
| 4,398,642 A | 8/1983 | Okudaria et al. |
| 4,410,364 A | 10/1983 | Finlayson et al. |
| 4,412,018 A | 10/1983 | Finlayson et al. |
| 4,429,079 A | 1/1984 | Shibata et al. |
| 4,434,075 A | 2/1984 | Mardis et al. |
| 4,434,076 A | 2/1984 | Mardis et al. |
| 4,442,163 A | 4/1984 | Kühner et al. |
| 4,450,095 A | 5/1984 | Finlayson |

(List continued on next page.)

FOREIGN PATENT DOCUMENTS

| | | |
|---|---|---|
| DE | 3806548 | 9/1988 |
| DE | 3808623 | 10/1988 |
| EP | 186456 | 7/1986 |
| EP | 0202532 | 11/1986 |
| EP | 261430 | 3/1988 |
| EP | 278403 | 8/1988 |
| EP | 295336 | 12/1988 |
| EP | 398551 | 11/1990 |
| EP | 459472 | 12/1991 |
| EP | 542266 A2 * | 5/1993 |
| EP | 542266 | 5/1993 |
| EP | 0590263 | 4/1994 |
| EP | 650994 | 5/1995 |
| EP | 0691212 | 1/1996 |
| EP | 0691376 | 1/1996 |
| EP | 681990 | 11/1996 |

(List continued on next page.)

OTHER PUBLICATIONS

Howley's Condensed Chemical Dictionary 12th Edition, Van Nostrand Reinholds, 1993 p127.*

(List continued on next page.)

*Primary Examiner*—Edward J. Cain
*Assistant Examiner*—Katarzyna I Wyrozebski Lee
(74) *Attorney, Agent, or Firm*—Troutman Sanders LLP; Todd Deveau; Jacqueline Haley

(57) ABSTRACT

This invention relates to a composite composition comprising one or more polyamide polymers or copolymers, one or more layered clay materials, and one or more alkoxylated ammonium cations. The invention also relates to a process for preparing a nanocomposite and articles produced from the nanocomposite, including bottles.

23 Claims, No Drawings

U.S. PATENT DOCUMENTS

| | | |
|---|---|---|
| 4,472,538 A | 9/1984 | Kamigaito et al. |
| 4,482,695 A | 11/1984 | Barbee et al. |
| 4,517,112 A | 5/1985 | Mardis et al. |
| 4,536,425 A | 8/1985 | Hekal |
| 4,546,126 A | 10/1985 | Breitenfellner et al. |
| 4,595,715 A | 6/1986 | Kuze et al. |
| 4,600,409 A | 7/1986 | Campbell |
| 4,646,925 A | 3/1987 | Nohara |
| 4,676,929 A | 6/1987 | Rittler |
| 4,680,208 A | 7/1987 | Aoki et al. |
| 4,720,420 A | 1/1988 | Crass et al. |
| 4,725,466 A | 2/1988 | Crass et al. |
| 4,739,007 A | 4/1988 | Okada et al. |
| 4,742,098 A | 5/1988 | Finlayson et al. |
| 4,769,078 A | 9/1988 | Tso |
| 4,777,206 A | 10/1988 | Rittler |
| 4,810,734 A | 3/1989 | Kawasumi et al. |
| 4,889,885 A | 12/1989 | Usuki et al. |
| 4,894,411 A | 1/1990 | Okada et al. |
| 4,946,365 A | 8/1990 | Kudert et al. |
| 4,957,980 A | 9/1990 | Kobayashi et al. |
| 4,983,432 A | 1/1991 | Bissot |
| 4,983,719 A * | 1/1991 | Fox et al. .................. 528/339 |
| 4,994,313 A | 2/1991 | Shimizu et al. |
| 5,028,462 A | 7/1991 | Matlack et al. |
| 5,034,252 A | 7/1991 | Nilsson et al. |
| 5,037,285 A | 8/1991 | Kudert et al. |
| 5,091,462 A | 2/1992 | Fukui et al. |
| 5,102,948 A | 4/1992 | Deguchi et al. |
| 5,110,501 A | 5/1992 | Knudson, Jr. et al. |
| 5,149,485 A | 9/1992 | Belcher |
| 5,153,061 A | 10/1992 | Cavagna et al. |
| 5,153,062 A | 10/1992 | Grolig et al. |
| 5,164,440 A | 11/1992 | Deguchi et al. |
| 5,164,460 A | 11/1992 | Yano et al. |
| 5,206,284 A | 4/1993 | Fukui et al. |
| 5,221,507 A | 6/1993 | Beck et al. |
| 5,248,720 A | 9/1993 | Deguchi et al. |
| 5,273,706 A | 12/1993 | Laughner |
| 5,314,987 A | 5/1994 | Kim et al. |
| 5,334,241 A | 8/1994 | Jordan |
| 5,336,647 A | 8/1994 | Naé et al. |
| 5,340,884 A | 8/1994 | Mills et al. |
| 5,374,306 A | 12/1994 | Schlegel et al. |
| 5,382,650 A | 1/1995 | Kasowski et al. |
| 5,385,776 A * | 1/1995 | Maxfield et al. ............ 428/297 |
| 5,414,042 A | 5/1995 | Yasue et al. |
| 5,434,000 A | 7/1995 | Konagaya et al. |
| 5,523,045 A | 6/1996 | Kudert et al. |
| 5,530,052 A | 6/1996 | Takekoshi et al. |
| 5,552,469 A | 9/1996 | Beall et al. |
| 5,578,672 A | 11/1996 | Beall et al. |
| 5,612,138 A | 3/1997 | Kurz et al. |
| 5,620,774 A | 4/1997 | Etchu et al. |
| 5,648,159 A | 7/1997 | Sato |
| 5,660,761 A | 8/1997 | Katsumoto et al. |
| 5,665,454 A | 9/1997 | Hosoi et al. |
| 5,728,764 A | 3/1998 | Bauer et al. |
| 5,747,560 A | 5/1998 | Christiani et al. |
| 5,780,376 A | 7/1998 | Gonzales et al. |
| 5,807,630 A | 9/1998 | Christie et al. |
| 5,830,544 A | 11/1998 | Kerscher et al. |
| 5,849,830 A | 12/1998 | Tipursky et al. |
| 5,876,812 A | 3/1999 | Frisk et al. |
| 5,882,751 A | 3/1999 | Occhiello et al. |
| 5,916,685 A | 6/1999 | Frisk |
| 5,942,320 A | 8/1999 | Miyake et al. |
| 5,952,093 A | 9/1999 | Nichols et al. |
| 5,972,448 A | 10/1999 | Frisk et al. |
| 5,993,769 A | 11/1999 | Pinnavaia et al. |
| 6,017,632 A | 1/2000 | Pinnavaia et al. |
| 6,034,163 A | 3/2000 | Barbee et al. |
| 6,036,765 A | 3/2000 | Farrow et al. |
| 6,050,509 A | 4/2000 | Clarey et al. |
| 6,057,396 A | 5/2000 | Lan et al. |
| 6,060,549 A | 5/2000 | Li et al. |
| 6,071,988 A | 6/2000 | Barbee et al. |
| 6,084,019 A | 7/2000 | Matayabas, Jr. et al. |
| 6,117,541 A | 9/2000 | Frisk |
| 6,120,860 A | 9/2000 | Bowen et al. |
| 6,156,835 A * | 12/2000 | Anderson et al. ........... 524/445 |
| 6,162,857 A | 12/2000 | Trexler et al. |
| 6,232,388 B1 | 5/2001 | Lan et al. |
| 6,254,803 B1 | 7/2001 | Matthews et al. |

FOREIGN PATENT DOCUMENTS

| | | |
|---|---|---|
| EP | 747451 | 12/1996 |
| EP | 0761739 | 3/1997 |
| EP | 780340 | 6/1997 |
| EP | 0822163 | 2/1998 |
| EP | 0846723 | 6/1998 |
| EP | 0 899 301 A1 | 3/1999 |
| EP | 0 909 787 A1 | 4/1999 |
| EP | 0909787 | 4/1999 |
| EP | 940430 | 9/1999 |
| GB | 1090036 | 11/1967 |
| GB | 2123014 | 1/1984 |
| JP | 75001156 | 1/1975 |
| JP | 75005735 | 3/1975 |
| JP | 75005751 | 3/1975 |
| JP | 75010196 | 4/1975 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10077427 | 3/1998 |
| JP | 10133013 | 5/1998 |
| JP | 10168305 | 6/1998 |
| JP | 10001608 | 1/1999 |
| WO | WO 84/03096 | 8/1984 |
| WO | WO 93/04117 | 3/1993 |
| WO | WO 93/04118 | 3/1993 |
| WO | WO 93/04125 | 3/1993 |
| WO | WO 93/11190 | 6/1993 |
| WO | WO 93/14922 | 8/1993 |
| WO | WO 94/11430 | 5/1994 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/17398 | 5/1997 |
| WO | WO 97/30950 | 8/1997 |
| WO | WO 97/31057 | 8/1997 |
| WO | WO 97/31973 | 9/1997 |
| WO | WO 97/44384 | 11/1997 |
| WO | WO 98/01346 | 1/1998 |
| WO | WO 98/29499 | 7/1998 |
| WO | WO 98/53000 | 11/1998 |
| WO | WO 99/02593 | 1/1999 |
| WO | WO 99/15432 | 4/1999 |
| WO | WO 99/38914 | 8/1999 |
| WO | WO 99/41299 | 8/1999 |

OTHER PUBLICATIONS

LeBaron et al., "Polymer–layered silicate nanocomposites: an overview," *App. Clay Sci.*, 15, 11–29 (1999).

Ke et al., "Crystallization, Properties, and Crystal and Nanoscale Morphology of PET–Clay Nanocomposites," *J. Appl. Polym. Sci.*, 71, 1139–1146 (1999).

Kawasumi et al., "Preparation and Mechanical Properties of Polypropylene–Clay Hybrids," *Macromolecules*, 30, 6333–6338 (1997).

Usuki et al., "Synthesis of Propylene–Clay Hybrid", *J. Appl. Polym. Sci.*, 63, 137–139 (1997).

Giannelis, "Polymer Layered Silicate Nanocomposites," *Advanced Materials*, 8, 29–35 (1996).

Kurokawa et al., "Preparation of a nanocomposite of polypropylene and smectite," *J. Materials Science Letters*, 15, 1481–1483 (1996).

Oriakhi et al., "Incorporation of poly(acryclic acid), poly(vinylsulfonate) and poly(styrenesulfonate) within layered double hydroxides," *J. Mater. Chem.*, 6, 103–107 (1996).

Messersmith et al., "Syntheses and Barrier Properties of Poly(ε–Caprolactone)–Layered Silicate Nanocomposites," *J. of Polym. Sci.*, 33, 1047–1057 (1995).

Pinnavaia et al., "Clay–Reinforced Epoxy Nanocomposites, "*Chem. Mater.*, 6, 2216–2219 (1994).

Sugahara et al., "Clay–Organic Nano–Composite; Preparation of a Kaolinite—Poly(vinylpyrrolidone) interaction Compound," *J. Ceramic Society of Japan*, 100, 413–416 (1992).

Yano et al., "Synthesis and properties of polyimide–clay hybrid," *ACS, Polymer Preprints*, 32, 65–66, (1991).

Fukushima et al., "Swelling Behavior of Montmorillonite by Poly–6–Amide," *Clay Minerals*, 23, 27–34 (1988).

Fukushima et al., "Synthesis of an Intercalated Compound of Montmorillonite and 6–Polyamide," *J. Inclusion Phenomena*, 5, 473–482, (1987).

Okada et al., "Synthesis and Characterization of a Nylon 6–Clay Hybrid," *ACS, Polymer Preprints*, 28, 447–448, (1987).

Fahn et al., "Reaction Products of Organic Dye Molecules with Acid–Treated Montmorillonite," *Clay Minerals*, 18, 447–458 (1983).

Greenland, "Adsorption of Polyvinyl Alcohols by Montmorillonite," *J. Colloid Sci.*, 18, 647–664 (1963).

MSDS—Polyvinyl Alcohol.

MSDS—Clay (Montmorillonite).

* cited by examiner

POLYAMIDE COMPOSITION COMPRISING A LAYERED CLAY MATERIAL MODIFIED WITH AN ALKOXYLATED ONIUM COMPOUND

CROSS-REFERENCE TO RELATED APPLICATIONS

This application claims priority to U.S. provisional application No. 60/210,064, filed on Jun. 7, 2000, now abandoned, and U.S. provisional application No. 60/143,352, filed on Jul. 12, 1999, now abandoned. This application is also a continuation-in-part of U.S. Ser. No. 09/452,826, filed on Dec. 1, 1999, now U.S. Pat. No. 6,417,262, which claims priority to U.S. provisional application No. 60/111,284, filed on Dec. 7, 1998, now abandoned. This application is also a continuation-in-part of U.S. Ser. No. 09/354,205, filed on Jul. 15, 1999, now pending, which claims priority to U.S provisional application No. 60/111,202, filed on Dec. 7, 1998, now abandoned.

FIELD OF THE INVENTION

This invention relates generally to a polymer-clay composition having improved gas permeability comprising a clay material and at least one organic cation. More particularly, this invention relates to a polyamide composition comprising layered clay material modified with an alkoxylated onium compound. This invention further relates to articles produced from the composition, and a process for preparing the composition.

BACKGROUND OF THE INVENTION

Polymer-platelet particle composites have received much attention lately due to their potential to improve polymer properties, including gas barrier, heat deflection temperature, and modulus.

U.S. Pat. No. 4,739,007 discloses composite materials comprising a polyamide matrix and a well dispersed, layered silicate material that is incorporated during polymerization and imparts high mechanical strength and excellent high temperature properties.

U.S. Pat. No. 5,385,776 discloses composite materials comprising a Nylon-6 matrix and a minor amount of a layered silicate material that is incorporated during melt extrusion and imparts rapid nucleation of the polyamide into the gamma crystal structure thereby improving modulus and resistance to plasticization by water.

U.S. Pat. No. 4,810,734 discloses nylon composites comprising a layered silicate material that has been treated with certain organic ammonium compounds and incorporated by synthesis using a dispersing aid.

PCT application WO 93/04117 discloses composite materials comprising a polyamide matrix and a layered silicate material that has been modified with certain primary or secondary organic ammonium compounds incorporated during melt extrusion and impart improved modulus to the polymer composite.

PCT application WO 93/11190 discloses Nylon composites comprising a layered silicate material that may optionally contain certain organic ammonium compounds, WHICH ARE TREATED WITH certain silane compounds and incorporated by melt blending.

*Journal of Applied Polymer Science*, Vol. 71 (1999), pg. 1139–1146, discloses the rapid crystallization of composite materials comprising a polyethylene terephthalate ("PET") matrix and an undisclosed clay material.

PCT application WO 98/29499 discloses high molecular weight polyester-platelet particle composites prepared by solid state polymerization of precursor composites prepared by incorporation of treated layered silicate materials by synthesis and by melt compounding. The use of alkoxylated ammonium compounds to pretreat the layered silicate is specifically disclosed.

PCT application WO 99/02593 discloses polyester composites comprising layered silicate materials that are treated with at least one polyalkoxylated ammonium salt comprising alkoxy ligands with greater than 5 alkyl oxide repeat units.

PCT application WO 96/08526 discloses thermoset epoxy resin composites comprising a mica-type layered silicate that is treated with tallow bis(2-hydroxyethyl)methyl ammonium salts.

Additional publications describing polymer nanocomposites comprising a polyamide matrix and dispersed layers of silicate include German Patent 3808623; *J. Inclusion Phenomena* 5, (1987), 473–485; *Clay Minerals*, 23, (1988) 27; *Polymer Preprints*, 32, (April 1991), 65–66; and *Polymer Preprints*, 28, (August 1987), 447–448.

Amorphous polyamides have been prepared and proposed as polymers for food packaging, offering improved resistance to whitening or hazing upon exposure to moisture, as described in U.S. Pat. Nos. 5,028,462 and 4,983,719, and offering improved physical properties, as described in U.S. Pat. No. 4,018,746. However, these patents do not disclose or suggest incorporation of a clay material into such amorphous polyamide to improve the barrier propertis of the polyamide or an article made therefrom. Further, these patents do not disclose or suggest that haze would be reduced in a composite comprising a clay material and an amorphous polyamide.

It has been found that polymer-platelet particle composites of both polyethylene terephthalate ("PET") and polyamides often exhibit rapid crystallization, which has been attributed to nucleation of the polymer matrix by the platelet particles. Clay particles in a nylon-6 nanocomposite, for example, induce crystallization, as described in U.S. Pat. No. 5,385,776. This can be an advantage for applications involving opaque, crystalline molded parts, as well as for imparting improved heat resistance and modulus to the parts. Examples of such opaque crystalline composites are the nylon composites disclosed in U.S. Pat. Nos. 5,385,776 and 4,739,007, and the PET composites discussed in *Journal of Applied Polymer Science*, Vol. 71 (1999), pg. 1139–1146.

However, rapid crystallization of polymer-clay composites is not always desirable, especially applications including, but not limited to, profile extrusion, extrusion blow molding, stretch blow molding, film extrusion, and blown film, and other applications where optical clarity of the composite is desired, and especially in two step molding applications. The rapid crystallization of prior art polymer-clay composites makes it difficult, if not impossible, to obtain clear multilayer preforms and/or blow molded containers and bottles, wherein the ability to further process an initially formed article is important. Rapid crystallization greatly reduces the available processing window when prior art polymer-clay composites are employed in conjunction with PET in the molding of clear plastic bottles.

Multilayer materials for packaging are known for film, bottles, and other containers. Multilayer injection molded preforms described, for example, in European Patent Application No. 0 278 403 A2 and U.S. Pat. No. 4,398,642, contain an outer thermoplastic layer to impart excellent
} overall properties to the material and an inner layer of thermoplastic resin possessing excellent gas-barrier properties. Molded containers produced from these multilayer preforms have potential advantages in regards to handling, safety, and the cost of production.

Therefore, there remains a need in the art for improving the gas barrier properties of polyamide composite materials, without adversely affecting their rheological properties and processability in conjunction with PET. There also remains a need in the art for an amorphous polyamide nanocomposite having good clarity and reduced haze. It is, therefore, desirable to significantly improve the barrier properties of polyamides using nanocomposite technology without markedly increasing their crystallization rate.

SUMMARY OF THE INVENTION

In accordance with the purpose(s) of this invention, as embodied and broadly described herein, this invention relates to composite compositions comprising polyamide polymers or copolymers, and certain layered clay materials, having alkoxylated "onium" cations associated therewith.

In another embodiment, this invention relates to processes for preparing the compositions, involving the steps of treating a layered clay material with at least one salt having certain alkoxylated "onium", to form a treated layered clay material, then mixing the treated layered clay material with a polymer composition comprising at least one polyamide polymer or copolymer.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific processes and conditions described, as specific processes and/or process conditions for processing polymer compositions and articles as such may, of course, vary. It is also understood that the terminology used herein is for the purpose of describing particular embodiments only and is not intended to be limiting.

It must also be noted that, as used in the specification and the appended claims, the singular forms "a," "an" and "the" included plural references unless the context clearly dictates otherwise.

Ranges may be expressed herein as from "about" or "approximately" one particular value and/or to "about" or "approximately" another particular value. When such a range is expressed, another embodiment includes from the one particular and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Whenever used in this specification, the terms set forth shall have the following meanings:

"Layered clay" or "layered clay material" shall mean any organic or inorganic material or mixtures thereof, such as a smectite clay mineral, which is in the form of a plurality of adjacent, bound layers. The layered clay comprises platelet particles and is typically swellable. Such clays may be naturally occurring or synthetically derived.

"Platelet particles," "platelets" or "particles" shall mean individual or aggregate unbound layers of the layered clay material. These layers may be in the form of individual platelet particles, ordered or disordered small aggregates of platelet particles (tactoids), and small aggregates of tactoids.

"Dispersion" or "dispersed" is a general term that refers to a variety of levels or degrees of separation of the platelet particles. The higher levels of dispersion include, but are not limited to, "intercalated" and "exfoliated."

"Intercalated" or "intercalate" shall mean a layered clay material that includes organic cations disposed between adjacent platelet particles or tactoids of the layered material to increase the interlayer spacing between the adjacent platelets and tactoids.

"Exfoliate" or "exfoliated" shall mean platelets dispersed predominantly in an individual state throughout a carrier material, such as a matrix polymer. Typically, "exfoliated" is used to denote the highest degree of separation of platelet particles, as compared to dispersed or intercalated particles.

"Exfoliation" shall mean a process for forming an exfoliate from an intercalated or otherwise less dispersed state of separation.

"Nanocomposite(s)" or "nanocomposite composition(s)" shall mean a polymer or copolymer having dispersed therein a plurality of individual platelet particles obtained from exfoliated, layered clay material.

"Matrix polymer" shall mean a thermoplastic or melt-processible polymer in which the platelet particles are exfoliated to form a nanocomposite.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species or is still identifiable as the starting chemical species. Thus, for example, an ethylene glycol residue in a polyester refers to one or more —OCH2CH2O— repeat units in the polyester, regardless of whether ethylene glycol is used to prepare the polyester, and regardless of whether the residue contains hydroxyl groups. Similarly, for example, a residue of a sodium montmorillonite clay refers to the product of a reaction of a sodium montmorillonite clay with other chemical compositions, such as an onium cation salt, regardless of whether the product of the reaction contains any sodium, or regardless of whether one skilled in the art would identify the product as a montmorillonite clay.

The term "alkyl" as used herein refers to a branched or unbranched saturated hydrocarbon group of 1 to 36 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain from 1 to 24 carbon atoms, or from 1 to 12 carbon atoms. The term "lower alkyl" intends an alkyl group of from one to six carbon atoms, preferably from one to four carbon atoms. The term "cycloalkyl" intends a cyclic alkyl group of from three to eight, preferably five or six carbon atoms.

The term "alkoxy" as used herein refers to an alkyl group bound through a single, terminal ether linkage; that is, an "alkoxy" group may be defined as —OR where R is alkyl as defined above. A "lower alkoxy" group intends an alkoxy group containing from one to six, more preferably from one to four, carbon atoms.

The term "alkylene" as used herein refers to a difunctional saturated branched or unbranched hydrocarbon chain containing from 1 to 36 carbon atoms, and includes, for example, methylene (—$CH_2$—), ethylene (—$CH_2$—$CH_2$—), propylene (—$CH_2$—$CH_2$($CH_3$)—), 2-methylpropylene [—$CH_2$—CH($CH_3$)—$CH_2$—], hexylene [—$(CH_2)_6$—] and the like; "Lower alkylene" refers to an alkylene group of from 1 to 6, more preferably from 1 to 4, carbon atoms. The term "cycloalkylene" as used herein refers to a cyclic alkylene group, typically a 5- or 6-membered ring.

In one embodiment, the invention relates to a novel polymer-based composite and/or nanocomposite material developed for packaging applications, particularly multilayer bottles for beer. This material exhibits the combination of high oxygen barrier and excellent processability.

We have found that prior art polyamide-clay composites can exhibit improved gas barrier properties as compared with that of the polyamides used alone. Therefore it was believed that polyamide-clay composites could potentially provide multilayer bottles with improved barrier properties, and/or permit the preparation of high-barrier multilayer bottles comprising thinner layers of the barrier material, thereby reducing raw material costs and improving recycle potential.

However, it was also found that typical polyamide platelet particle composites crystallize more rapidly than clay-free polyamides, which can make the preparation of bottles difficult and sometimes impossible. Further, it has been found that for prior art polyamide-clay composites as the gas barrier properties increase by the inclusion of more layered clay, the crystallization rate becomes more rapid.

Unexpectedly, it has been discovered that the presence of certain alkoxylated "onium" and/or ammonium cations in association with certain layered clay materials results in polyamide-clay composites and/or nanocomposites that exhibit surprisingly improved oxygen barrier properties as compared with the polyamides themselves. Even more surprisingly, the polyamide-clay composites of the invention usually do not exhibit the expected sharply increased crystallization rate and resulting poor processability, as compared to the neat polyamide or PET. The polyamide clay composites can also unexpectedly exhibit desirable shear sensitive melt flow characteristics. Moreover, the polyamide-clay composites of the invention can unexpectedly retain their clarity and reduced haze after processing in multilayer constructions with PET.

Therefore, in some aspects, this invention relates to polymer composite materials comprising at least one polyamide resin and platelet particles uniformly dispersed therein and articles produced from the composite. More specifically, this invention relates to a polymer-platelet particle composite comprised of at least one polyamide resin and at least one layered clay material which has been treated with at least one alkoxylated onium compound, for example, an alkoxylated ammonium compound. Composite compositions according to the present invention are especially useful for preparing clear bottles and film that exhibit improved gas barrier properties.

The invention also relates generally to amorphous high barrier matrix polyamides. These amorphous polyamides have been found to show unexpected resistance to haze formation, crystallization, and other defect formation in the presence of dispersed and/or exfoliated organically modified clays when undergoing orientation and/or other film processing steps.

The composite compositions of this invention overcome the nucleating effect caused by the presence of platelet particles and provide polymer-platelet composites that have the benefits of the improved properties afforded by the incorporation of platelet particles, but remain readily processible for a wide variety of applications. Surprisingly, when alkoxylated ammonium compounds are used to treat the clays, the impact on the crystallization rate of the matrix material can be lessened and in some instances may be reversed. Additionally, articles produced from the composites can achieve lower haze and higher gas barrier properties than articles produced from prior art polyamide-clay composites.

This invention also relates, in some embodiments, to composite compositions comprising:
a. one or more polyamide polymers or copolymers,
b. one or more layered clay materials, and
c. one or more alkoxylated onium cations.

In preferred embodiments of the invention, the alkoxylated onium cation is tertiary or quaternary. In further preferred embodiments, the alkoxylated onium cation is an alkoxylated ammonium cation or an alkoxylated phosphonium cation.

In yet other preferred embodiments, the invention relates to A nanocomposite material comprising:
a. one or more polyamide polymers or copolymers comprise poly(m-xylylene adipamide), or poly(m-xylylene adipamide-co-isophthalamide), and
b. one or more layered clay materials comprising a residue of a bentonite, or a residue of a montmorillonite, wherein the layered clay material comprises quaternary alkoxylated ammonium cations having the structure:

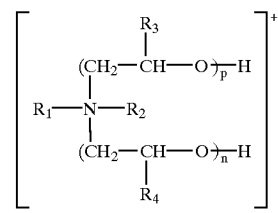

wherein $R_1$ and $R_2$ may be the same or different and are organic ligands comprising from 1 to 30 carbon atoms; p and n are integers of at least 1 and can be the same or different; and $R_3$ and $R_4$, may be the same or different and are hydrogen or hydrocarbons comprising from 1 to 4 carbon atoms.

In another aspect, the invention relates to a polymer-clay nanocomposite having an improved gas permeability comprising:
a. a melt-processible matrix polymer, and
b. a layered clay material treated with an alkoxylated onium cation, wherein the treated clay material is incorporated into the matrix polymer.

In yet another aspect, the invention relates to a polymer-clay nanocomposite having an improved gas permeability comprising:
a. a melt-processible matrix polymer comprising poly(m-xylylene adipamide), poly(hexamethylene isophthalamide-co-terephthalamide), or poly(m-xylylene adipamide-co-isophthalamide), and
b. a layered clay material comprising a Wyoming-type bentonite or montmorillonite treated with an alkoxylated onium cation comprising octadecylmethylbis(2-hydroxyethyl) ammonium chloride or tallowmethylbis (2-hydroxyethyl) ammonium,
wherein treated clay material is incorporated into the matrix polymer.

The invention also relates to a polyamide-clay nanocomposite comprising:
a. an amorphous matrix polyamide comprising
   i. a residue of a dicarboxylic acid component comprising at least one diacid comprising adipic acid, naphthalene-2,6-dicarboxylic acid, isophthalic acid, terephthalic acid, 1,3-phenylenedioxydiacetic acid, 1,4-cyclohexanedicarboxylic acid, or phenylindane dicarboxylic acid, and
   ii. a residue of at least one diamine component comprising m-xylylenediamine, and
(b) a layered clay material comprising Wyoming-type sodium montmorillonite or Wyoming-type sodium bentonite treated with an organic cation to effect cation exchange, wherein the clay material is dispersed in the matrix polyamide.

In yet another embodiment, the invention relates to a composite composition comprising:
a. one or more polyamide polymers or copolymers,
b. one or more layered clay materials, and
c. one or more alkoxylated phosphonium cations represented by the formula,

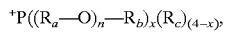

wherein, n is an integer of one or more, x is an integer from 1 to 4, $R_a$ is a $C_1-C_{20}$ carbon-containing residue, $R_b$ is hydrogen or a $C_1-C_{16}$ carbon-containing group or residue, and $R_c$ is hydrogen or one or more $C_1-C_{30}$ carbon-containing groups or residues that may be the same or different.

The invention also provides process for preparing a composite composition comprising the steps of:
a. treating a layered clay material with at least one ammonium salt comprising one or more alkoxylated ammonium cations wherein the cation is tertiary or quaternary, thereby forming a treated layered clay material, and
b. mixing the treated layered clay material with a composition comprising at least one polyamide polymer or copolymer.

The invention also provides an intercalate formed by contacting a layered clay material with at least one tertiary or quaternary alkoxylated ammonium cation intercalant, to achieve sorption and ion-exchange of the alkoxylated ammonium cation with interlayer exchangeable cations of said layered clay material.

It is to be understood that the invention comprises various component parts and/or elements, which are discussed generally herinabove, and more specifically hereinbelow, which may be used or employed in any combination.

POLYAMIDE POLYMERS AND COPOLYMERS

The polyamide polymer or copolymer of the invention comprise at least about ten or more first monomeric repeat units having an amide group (—C(O)—NH—), wherein the first monomeric repeat units are bonded to other monomeric repeat units that may be the same or different.

The polyamides of the invention are generally prepared by processes that are well known in the art. As is known in the art, polyamides may be prepared by ring opening polymerization of cyclic amides, termed "lactams", such as caprolactam. Cleavage of the lactam group opens the monomeric ring of the lactam, and generates a di-functional monomeric unit having both an amine component and a carboxylic acid component, which then condense intermolecularly, to form a polyamide.

The polyamides of the invention may alternatively comprise the polymerization reaction product (or residue) of one or more diamine components and one or more dicarboxylic acid components. In these polyamides, the amide group is formed by the condensation of the amine functional groups of an amine component and the carbonyl carbon of a carboxylic acid component. If more than one diamine component or more than one dicarboxylic acid component is condensed, the condensation reaction is termed a co-polymerization reaction, and the reaction product is termed a co-polyamide. The diamine and diacid components are preferably reacted in approximately stoichiometric quantities. Diacid chlorides, esters, etc., can suitably be used. A solvent may be used in the preparation of the polyamide.

Any of the above-described general methods may be utilized to prepare the polyamides of the invention.

The dicarboxylic acid component comprises at least a first diacid component and optionally a second diacid component. The diacids may be in any ratio of mole percent of the total diacid moieties present in the polyamide. Preferably, one of the diacids is present in an amount of about 10 to about 90 mole percent of the total diacid moieties present in the polyamide, more preferably of about 45 to about 85 and even more preferably about 50 to about 80 mole percent of the total diacid moieties present in the polyamide.

The dicarboxylic acids of this invention include, but are not limited to dicarboxylic acids having from 3 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, and/or cycloaliphatic dicarboxylic acids preferably having 8 to 12 carbon atoms.

Examples of further suitable dicarboxylic acids include, but are not limited to phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi(oxyacetic acid), sebacic acid, succinic acid, adipic acid, glutaric acid, azelaic acid, and the like. Adipic acid, or esters or acid halide derivatives thereof are particularly preferred dicarboxylic acid components.

In one embodiment, the diacid component may be defined by formula (I):

HO$_2$CCH$_2$X(RX)$_y$CH$_2$CO$_2$H    (I)

wherein X is —O—, —S—, or

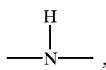

Y is 0 or 1, and R is an aromatic moiety comprising from about 6 to about 13 carbon atoms. Suitable R groups include, but are not limited to the following:

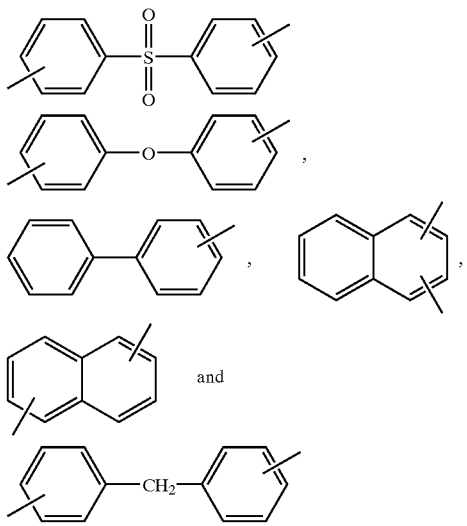

Preferably, in the embodiment as defined by formula (I), the dicarboxylic acid component comprises iminodiacetic acid, oxydiacetic acid, thiodiacetic acid, 1,4-phenylenedioxydiacetic acid, 1,3-phenylenedioxydiacetic acid, etc., or mixtures thereof.

Suitable diamine components may vary widely, as is known in the art. The diamine component comprises an aliphatic diamine having about 2 to about 12 carbon atoms. The aliphatic diamines may contain aromatic groups, as long as an alkylene group (e.g., a methylene group) is interposed between an amino group and an aromatic ring. The aliphatic diamines also include cycloaliphatic diamines such as piperazine. Examples of suitable diamine components include 1,2-ethylenediamine, 1,3-propylenediamine, 1,6-hexamethylenediamine, 1,12-dodecylenediamine, 1,4-clohexanebismethylamine, piperazine, p-xylylenediamine, m-xylylenediamine, or a mixture thereof. A particularly preferred diamine component is m-xylylenediamine, which is refered to as "MX" herein.

Other diamines or mixtures of diamines can also be used with the preferred diamine (m-xylylenediamine) to form the amorphous polyamide. Some representative polyamides of this invention include, but are not limited to those shown in Table 1.

Suitable polyamides include partially aromatic polyamides, aliphatic polyamides, wholly aromatic polyamides and/or mixtures thereof. By "partially aromatic polyamide," it is meant that the amide linkage of the partially aromatic polyamide contains at least one aromatic ring and a nonaromatic species.

TABLE 1

| Example | Polyamide | I.V. | $T_g$ (° C.) | $T_m$ (° C.) |
|---|---|---|---|---|
| 1 | PDA(MX) | 0.522 | 96.7 | None |
| 2 | PDA-10-TPA(MX) | 0.403 | 101.1 | None |
| 3 | PDA-10-NDA(MX) | 0.390 | 101.1 | None |
| 4 | A-19-IPA(MX) | 0.828 | 104.1 | None |
| 5 | A-18-TPA(MX) | 0.778 | 103.8 | None |
| 6 | A-18-NDA(MX) | 0.798 | 106.3 | None |
| 7 | A-19-PIDA(MX) | 0.498 | 109.6 | None |

A preferred class of amorphous high barrier matrix polyamides of this invention comprise the reaction product or residue of a dicarboxylic acid component comprising at least two of adipic acid (A), 2,6-napthalene dicarboxylic acid (NDA), isophthalic acid (IPA), terephthalic acid (TPA), 1,3-phenylenedioxydiacetic acid (PDA), 1,4-cyclohexanedicarboxylic acid (CHDA), and phenylindane dicarboxylic acid (PIDA), and a diamine component comprising m-xylylenediamine (MX). The combination of at least two of the diacids with the diamine effectively disrupts the crystallization tendency of these macromolecules to allow clear transparent amorphous structures to be maintained throughout the processing steps. Using more than one diamine with one diacid may form an amorphous polyamide. Also, using more than one diacid and more than one diamine may form an amorphous polyamide. MX is the preferred diamine due to its high barrier properties.

Referring to Table 1, PDA(MX) means 100 mole % PDA with 100 mole % MX; PDA-10-TPA(MX) means 90 mole % PDA and 10 mole % TPA with 100 mole % MX; PDA-10-NDA(MX) means 90 mole % PDA and 10 mole % NDA with 100 mole % MX; A-19-IPA(MX) means 81 mole % A and 19 mole % IPA with 100 mole % MX; A-18-TPA(MX) means 82 mole % A and 18 mole % TPA with 100 mole % MX; A-18-NDA(MX) means 82 mole % A and 18 mole % NDA with 100 mole % MX; A-18-PIDA(MX) means 82 mole % A and 18 mole % PIDA with 100 mole % MX.

"Amorphous", as used for this invention, means that the polyamide does not show a melting on crystallization peak on a second DSC scan at a rate of 20° C./min. Generally, an amorphous polymer and/or polymer composition is characterized by a high degree of transparency (clarity) and a lack of a sharply defined melting point. The polyamides as shown in Table 1 do not have a defined melting point ($T_m$). After forming a composition of this invention, some of the compositions may have a minor melting point with ΔH less than 0.5 cal/g due to the nucleating effect of the clay.

Preferred wholly aromatic polyamides comprise in the molecule chain at least 70 mole % of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75. Each of the aforementioned references is hereby incorporated herein by this reference in its entirety, for their teachings of the compositions of preferred wholly aromatic polyamides and methods for their synthesis.

Although the preferred polyamides are linear or nearly linear, polyamides with other architectures, including branched, star, cross-linked and dendritic structures, may be used if desired.

Polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used according to the invention herein.

Preferred partially aromatic polyamides include, but are not limited to poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide) and the like or a mixture thereof. More preferred partially aromatic polyamides include, but are not limited to poly(m-xylylene adipamide), poly(hexamethylene isophthalamide-co-terephthalamide), poly(m-xylylene adipamide-co-isophthalamide), and/or a mixture thereof. The most preferred partially aromatic polyamide is poly(m-xylylene adipamide), i.e. "MXD6" which is available from Mitsubishi Gas and Chemical Company, Chiyodaku, Tokyo, Japan. Poly(m-xylylene adipamide) is a preferred polyamide due to its availability, high gas barrier properties, and processability in conjunction with PET.

Poly(m-xylylene adipamide) is prepared from adipic acid and meta-xylene diamine. Copolyamides of MXD6 are also available having comonomers including isophthalic acid. MXD6 and its copolyamides are often preferred barrier materials for use in multilayer PET bottles because they require similar processing conditions and have comparable rheology to PET, and due to their improved resistance to delamination from PET as compared to EVOH. Although MXD6 crystallizes more rapidly than PET, its crystallization rate is slow enough to permit the manufacture of multilayer bottles. The oxygen barrier of MXD6 is approximately 20–40 times the oxygen barrier of PET. We have found that MXD6-platelet particle composites exhibit significantly improved oxygen barrier and, therefore, provide multilayer bottles with improved barrier and/or permit the preparation of high-barrier multilayer bottles comprising thin layers of the barrier material, thereby reducing raw material costs and improving recyclability.

Preferred aliphatic polyamides include, but are not limited to polycapramide (nylon 6), poly-aminoheptanoic acid (nylon 7), poly-aminononanoic acid (nylon 9), polyundecaneamide (nylon 11), polyaurylactam (nylon 12), poly(ethylene-adipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly(octamethylene-adipamide) (nylon 8,6), poly(decamethylene-adipamide) (nylon 10,6), poly(dodecamethylene-adipamide) (nylon 12,6) and poly(dodecamethylene-sebacamide) (nylon 12,8).

More preferred aliphatic polyamides include, but are not limited to poly(hexamethylene adipamide) and poly(caprolactam). The most preferred aliphatic polyamide is poly(hexamethylene adipamide).

The polymers of the present invention exhibit an I.V. of about 0.25 to about 1.5 dL/g, preferably about 0.4 to about 1.2 dL/g, and more preferably of about 0.7 to about 0.9 dL/g. The I.V. is measured at 25° C. in a 60/40 by weight mixture in phenol/1,1,2,2-tetrachloroethane at a concentration of 0.5 grams per 100 ml. Polymers, especially polyamides having an I.V. within the ranges specified above are of sufficiently high molecular weight to be used in the formation of the articles of the present invention.

Poly(m-xylylene adipamide) having an inherent viscosity (I.V.) of at least about 0.5 dL/g, and preferably at least about 0.7 dL/g, is a preferred polyamide due to its availability, high gas barrier properties, and processability. The I.V. is typically measured in a mixture of 60 weight % phenol and 40 weight % 1,1,2,2-tetrachloroethane at a concentration of 0.5 g/100 ml (solvent) at 25° C.

Oligomeric polyamides of lower I.V. may be preferred for some specialized purposes. For example, lower I.V. polyamides may be preferred for the formulation of a preliminary composite with the layered clay materials, because the lower molecular weights of the lower I.V. polyamides can aid initial dispersion and/or exfoliation of the layered clay materials. Subsequently, the resulting preliminary composite may be beneficially blended with higher molecular weight polyamides (or other polymers) to provide the structural properties desired. The I.V. of the oligomeric polyamide prior to melt mixing is preferably from about 0.1 and 0.5 dL/g, and more preferably from 0.3 dL/g to 0.5 dL/g as measured in a mixture of 60 weight percent phenol and 40 weight percent 1,1,2,2-tetrachloroethane at a concentration of 0.5 g/100 ml (solvent) at 25° C. Preferably, the I.V. of the high molecular weight matrix polymer is at least 0.7 dL/g and more preferably is at least 1.0 dL/g as measured in a mixture of 60 weight percent phenol and 40 weight percent 1,1,2,2-tetrachloroethane at a concentration of 0.5 g/100 ml (solvent) at 25° C. Moreover, the oligomeric polyamide preferably has a number average molecular weight of from about 200 to about 10,000 g/mol and may be a homo or co-oligomer. Low molecular weight polyamides may also contain small amounts of trifunctional or tetrafunctional comonomers such as trimellitic anhydride, pyromellitic dianhydride, or other polyamide forming polyacids and polyamines known in the art, which may improve the processing characteristics of the final polymer blends.

The polymers of the present invention may also include suitable additives normally used in polymers. Such additives may be employed in conventional amounts and may be added directly to the reaction forming the matrix polymer. Illustrative of such additives known in the art are colorants, pigments, carbon black, glass fibers, fillers, impact modifiers, antioxidants, stabilizers, flame retardants, reheat aids, crystallization aids, acetaldehyde reducing compounds, recycling release aids, oxygen scavengers, plasticizers, nucleators, mold release agents, compatibilizers, processing aids and the like, or their combinations.

All of these additives and many others and their use are known in the art and do not require extensive discussion. Therefore, only a limited number will be referred to, it being understood that any of these compounds can be used in any combination so long as they do not hinder the present invention from accomplishing its objects.

Layered Clay Materials (Platelet Particles)

Preferred "layered clay materials" or "clay materials" employed in the invention include any solid material having at least some inorganic anionic atoms, ions, or chemical groups arranged in generally planar layers in the solid state, wherein the spacing between at least some of the generally planar layers are capable of being increased, swelled, or separated by the insertion of inorganic or organic materials therebetween.

Preferably, the layered clay materials of the invention are swellable free flowing powders having a cation exchange capacity from about 0.3 to about 3.0 milliequivalents per gram of mineral (meq/g), preferably from about 0.90 to about 1.5 meq/g, and more preferably from about 0.95 to about 1.25 meq/g. The clay may have a wide variety of exchangeable cations present in the galleries between the layers of the clay, including, but not limited to cations comprising the alkaline metals (group IA), the alkaline earth metals (group IIA), and their mixtures. The most preferred cation is sodium; however, any cation or combination of cations may be used provided that most of the cations may be exchanged for organic cations (onium ions. The exchange may occur by treating a individual clay or a mixture of clays with organic cations.

Many layered clay materials are silicates. As used herein, "Silicate" shall mean any composition having silicon atoms bound to one or more oxygen atoms to form anionic groups, in combination with one or more additional cations, wherein the cations may be inorganic, metalic, or organic cations.

Layered clay materials that may be utilized herein include natural, synthetic, and modified phyllosilicates. Illustrative of such natural clays are smectite clays, such as montmorillonite, hectorite, mica, vermiculite, bentonite, nontronite, beidellite, volkonskoite, saponite, magadite, kenyaite, and the like. Illustrative of such synthetic clays are synthetic mica, synthetic saponite, synthetic hectorite, and the like. Illustrative of such modified clays are flouronated montmorillonite, flouronated mica, and the like. Suitable clays are available from various companies including Nanocor, Inc., Arlington Heights Ill., Southern Clay Products, Gonzalez Tex., Kunimine Industries, Ltd., Chiyodaku, Tokyo, Japan, and Rheox of Hightown, N.Y.

The most preferred platelet particles are derived from sodium bentonite or sodium montmorillonite. Such clays are readily available in the U.S., and are also sometimes referred to as Wyoming-type bentonite or Wyoming type montmorillonite. One of ordinary skill in the art will readily recognize that Wyoming type montmorillonite and/or Wyoming-type bentonite are naturally occuring layered clay materials comprising large proportions of sodium bentonite or sodium montmorillonite. Thus it may be stated that highly preferred platelet particles for use in the present invention are residues derived from further treatment of any of sodium bentonite, sodium montmorillonite, "Wyoming type" bentonite or "Wyoming type" montmorillonite. It is to be understood that at least some of the sodium cations of a natural or synthetic sodium bentonite or sodium bentonite, a naturally occurring "Wyoming type" bentonite or "Wyoming type" montmorillonite are removed and/or exchanged when treated with salts of the alkoxylated onium cations of the invention. Nevertheless, for the purposes of this invention and disclosure, the residues of the treated clays may be referred to, and are defined as a "Wyoming type bentonite", a "Wyoming type montmorillonite", a "sodium bentonite", or a "sodium montmorillonite". Residues of such clays need not contain detectable amounts of sodium after the clays have undergone treatment with the alkoxylated onium cation salts of the invention. However, some sodium cations may remain.

Preferred clay materials are phyllosilicates of the 2:1 type having a cation exchange capacity of 0.5 to 2.0 meq/g. The most preferred clay materials are smectite clay minerals, particularly bentonite or montmorillonite, more particularly Wyoming-type sodium montmorillonite or Wyoming-type sodium bentonite having a cation exchange capacity from about 0.95 to about 1.25 meq/g. The most preferred layered clay materials are derived from sodium bentonite or sodium montmorillonite.

Other non-clay materials having the above-described ion-exchange capacity and size, such as chalcogens, may also be used as a source of platelet particles under the present invention. Chalcogens are salts of a heavy metal and group VIA (O, S, Se, and Te). These materials are known in the art and do not need to be described in detail here.

Generally, layered silicate materials are a dense agglomeration of platelet particles which are closely stacked together like cards in a deck. The platelet particles of the present invention generally have a thickness of less than about 2 nm and a diameter in the range of about 10 to about 5000 nm. For the purposes of this invention, such measurements refer only to the platelet particle and not the alkoxylated ammonium compounds or any additional dispersing aids and treatment compounds which might be used. These layers may be in the form of individual platelet particles, ordered or disordered small aggregates of platelet particles (tactoids), and small aggregates of tactoids. Suitable platelet particles are preferably derived from layered silicate materials which are free flowing powders having a cation exchange capacity between about 0.8 and about 1.3 meq/g and preferably between about 0.95 and about 1.25 meq/g.

Certain prior art references have defined the degree of separation of platelet particles derived from layered clay materials based on peak intensity and basal spacing value, or lack of predominant basal spacing, as determined by X-ray analyses of polymer-platelet composites. Even though X-ray analysis alone often does not unambiguously predict whether or not the platelet particles are individually dispersed in the polymer, it can often allow quantification of the tactoids present. As such, X-ray analysis only provides information related to the well-ordered aggregates, which are only a small portion of the platelet particles present. Moreover, in polymer nanocomposites, X-ray analysis alone does not accurately predict the dispersion of the platelet particles in either the polymer or the resultant gas barrier improvement. TEM images of polymer-platelet composites show that platelet exist in a variety of forms, including, but not limited to, individual platelets (the exfoliated state), disordered agglomerates of platelets, well ordered or stacked aggregates of platelets (tactoids), swollen aggregates of stacked platelets (intercalated tactoids), and aggregates of tactoids.

Alkoxylated Onium Salts and/or Cation

In an embodiment of this invention, an intercalated layered clay material is prepared by the reaction of a swellable layered clay with an organic cation or "onium" cation, preferably an ammonium compound (to effect partial or complete cation exchange). If desired, two or more organic cations may be used to treat a clay. Moreover, mixtures of organic cations may also be used to prepare an intercalated layered clay material, wherein the intercalated layered clay material in a polyamide nanocomposite comprises a mixture of intercalated clays.

Organic cations used to intercalate a clay material or a mixture of clay materials of a nanocomposite of this invention are derived from organic cation salts, preferably onium salt compounds. "Onium" salts useful for the nanocomposite and process of this invention may generally be represented by the following formula (I):

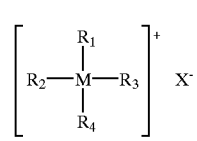

(I)

wherein M is either nitrogen or phosphorous; $X^-$ is a halide, hydroxide, or acetate anion, preferably chloride and bromide; and $R_1$, $R_2$, $R_3$, and $R_4$ are independently organic and/or oligomeric ligands or may be hydrogen.

Examples of useful organic ligands include, but are not limited to, linear or branched alkyl groups having 1 to 22 carbon atoms, aralkyl groups which are benzyl and substituted benzyl moieties including fused-ring moieties having linear chains or branches of 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having repeating units comprising 2 to 6 carbon atoms. Examples of useful oligomeric ligands include, but are not limited to a poly(alkylene oxide) group such as polyethylene glycol groups, and polybutylene glycol groups; polystyrene, polyacrylate, polycaprolactone, and the like.

Examples of useful organic cations include, but are not limited to alkyl ammonium ions, such as tetramethyl ammonium, hexyl ammonium, butyl ammonium, bis(2-hydroxyethyl) dimethyl ammonium, hexyl benzyl dimethyl ammonium, benzyl trimethyl ammonium, butyl benzyl dimethyl ammonium, tetrabutyl ammonium, di(2-hydroxyethyl) ammonium, and the like, and alkyl phosphonium ions such as tetrabutyl phosphonium, trioctyl octadecyl phosphonium, tetraoctyl phosphonium, octadecyl triphenyl phosphonium, and the like or mixtures thereof.

Other particularly useful organic cations for this invention include, but are not limited to alkyl ammonium ions such as dodecyl ammonium, octadecyl trimethyl ammonium, bis(2-hydroxyethyl) octadecyl methyl ammonium, octadecyl benzyl dimethyl ammonium, and the like or mixtures thereof.

Illustrative examples of suitable polyalkoxylated ammonium compounds include the hydrochloride salts of polyalkoxylated amines such as JEFFAMINE (of Huntsman Chemical), namely, JEFFAMINE-506 and JEFFAMINE 505, and an amine available under the trade name ETHOMEEN (of Akzo Chemie America, Chicago Ill.), namely, ETHOMEEN 18/25, which is octadecyl bis(polyoxyethylene[15])amine, wherein the numbers in brackets refer to the total number of ethylene oxide units. A further illustrative example of a suitable polyalkoxylated ammonium compound is ETHOQUAD 18/25 (of Akzo Chemie America), which is octadecyl methyl bis(polyoxyethylene [15]) ammonium chloride, wherein the numbers in brackets refer to the total number of ethylene oxide units.

Preferred onium cations or compounds are "alkoxylated onium" compounds or cations, which may include any cationic compound of nitrogen or phosphorus having at least one alkoxyl group or residue bound thereto. Alkoxylated onium compounds therefore have the structure

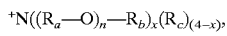

wherein M is nitrogen or phosphorus, wherein, n is an integer of one or more, x is an integer from 1 to 4, $R_a$ is a $C_1$–$C_{20}$ carbon-containing residue, $R_b$ is hydrogen or a $C_1$–$C_{16}$ carbon-containing group or residue, and $R_c$ is hydrogen or a $C_1$–$C_{30}$ carbon-containing group or residue. Alkoxylated onium compounds comprising either nitrogen or phosphorus atoms are typically effective for treating layered clay materials which may be used forming composites with polyamides according to the present invention. Alkoxylated onium compounds where M is nitrogen (i.e. "ammonium" compounds) are particularly preferred in many applications, because of lower cost, greater availability, and lower potential for toxicological and/or environmental problems.

The term "alkoxylated" as used herein is an adjective referring to a chemical compound, ion, or residue having an alkoxyl group or residue, regardless of the method used to prepare the chemical compound, ion, or residue. The term "alkoxylate" may also be a verb referring to a process of attaching an alkoxyl group to another chemical compound, ion, or group. The term "alkoxyl" as used herein refers to a hydrocarbon group or residue of about 1 to 36 carbon atoms having (a) at least one terminal alkoxy group (i.e. —OR), or (b) at least one terminal hydroxyl group (i.e. —OH), bound to any one of the carbon atoms of the hydrocarbon group or residue. An alkoxyl group may be branched or unbranched, saturated or unsaturated. As one of ordinary skill in the art would recognize, an alkoxyl group may or may not have additional heteroatomic substitutent atoms or groups, including oxygen, halides, nitrogen containing groups, amines, sulfur containing groups, and the like. Examples of alkoxyl groups include a hydroxymethyl group, a 1- or 2-hydroxyethyl group, a 1- or 2-methoxyethyl group, a 2-ethoxybutyl group, a 4-ethoxybutyl group, a 4-hydroxybutyl group, a poly(ethylene glycol) group, a poly(butyleneglycol) group, and higher branched, straight chain, or cyclic analogs thereof.

Therefore, in some embodiments alkoxylated ammonium cations and/or compounds of the invention have a cation of the structure

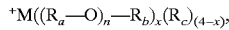

wherein n is an integer of one or more, x is an integer from 1 to 4, $R_a$ is a $C_1$–$C_{20}$ carbon-containing residue, $R_b$ is hydrogen or a $C_1$–$C_{16}$ carbon-containing group or residue, and the (($R_a$—O)$_n$—$R_b$) groups may be the same or different; and $R_c$ is hydrogen or a $C_1$–$C_{30}$ carbon-containing group or residue, and the $R_c$ groups may be the same or different. Preferred alkoxylated ammonium compounds have at least one hydroxyalkyl group in that at least one $R_b$ group is hydrogen. Alkoxylated ammonium compounds may be primary, secondary, tertiary, or quaternary, depending on the number of $R_c$ groups that are hydrogen. Preferred alkoxylated ammonium cations are tertiary (i.e. only one of $R_c$ may be hydrogen), or quartenary (i.e. none of the $R_c$ groups is hydrogen).

Electrically neutral alkoxylated amine compounds may be converted to primary, secondary, or tertiary ammonium salts by reaction with a Bronsted acid, to form an N—H bond. Electrically neutral alkoxylated amine compounds may also be converted to quaternary ammonium salts or cations by complete alkylation with an alkylating agent, wherein suitable alkylating agents that include but are not limited to alkyl halides, alkyl sulfates, and the like. Suitable electrically neutral alkoxylated amine compounds include but are not limited to, those sold under the trade name of JEFFAMINE™ (from Huntsman Chemical, Twin Falls Id.).

A preferred sub-class of the class of alkoxylated ammonium cations and/or compounds are hydroxyalkylated ammonium cations and/or compounds. The term "hydroxyalkylated" is an adjective referring to a chemical compound, ion, or residue having a hydroxyalkyl group, regardless of the method used to prepare the chemical compound, ion, or residue. The term "hydroxyalkyl" as used herein refers to a hydrocarbon group or residue of about 1 to 36 carbon atoms having at least one terminal hydroxyl (—OH) group bound to any one of the carbon atoms, or an alkylene residue. Hydroxyalkyl groups are a sub-genus of the larger genus of "alkoxyl" groups in that they must have a terminal hydroxyl group, although "alkoxy" groups optionally may also be present on a hydroxyalkyl group. Examples of hydroxyalkyl groups include but are not limited to hydroxymethyl groups (i.e. a —CH$_2$—OH group), 1- or 2-hydroxyethyl groups (i.e.

a —CH(OH)—CH$_3$ group or a —CH$_2$—CH$_2$—OH group, 1- or 3-hydroxypropyl groups, 4-hydroxybutyl groups, and higher branched, straight chain, or cyclic analogs thereof. Hydroxyalkylated ammonium cations and/or compounds are sometimes preferred over alkoxylated ammonium cations and/or compounds because the more polar hydroxyl groups may more favorably interact with or hydrogen bond to the relatively polar amide functional groups of a polyamide.

Useful alkoxylated ammonium compounds (salts) for use in the composites, nanocomposites and processes of this invention include mono-alkoxylated, di-alkoxylated, tri-alkoxylated, and tetra-alkoxylated ammonium compounds. Hydroxyalkylated compounds are also useful in the present invention and may include mono-hydroxyalkylated, di-hydroxyalkylated, tri-hydroxyalkylated, or tetra-hydroxyalkylated ammonium cations.

Preferred mono-alkoxylated ammonium salts for use in the composites and processes of this invention include compounds that can be represented as follows:

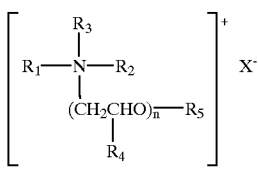

wherein N represents nitrogen; X$^-$ represents an anion, which is preferably a halide atom such as chloride or bromide; $R_1$, $R_2$, and $R_3$ may be the same or different and are organic or oligomeric ligands comprising 1 to 30 carbon atoms, or may be hydrogen; n is at least 1; $R_4$ is hydrogen or a hydrocarbon comprising 1 to 4 carbon atoms; and $R_5$ is hydrogen or a hydrocarbon comprising 1 to 7 carbon atoms.

With respect to the alkoxylated onium compounds or cations, preferred alkoxyl groups comprise a group or residue exemplified above and below by the formula:

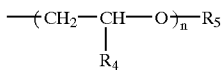

which may represent either an alkoxyl group or a hydroxyalkyl group. Examples of useful alkoxyl ligands include, but are not limited to groups or residues that comprise methoxymethyl, hydroxyethyl, methoxyethyl, hydroxypropyl, hydroxybutyl, poly(ethylene oxide), poly(propylene oxide), poly(butylene oxide), and the like. Preferred mono-alkoxylated ammonium cations are tertiary (i.e. only one of $R_1$, $R_2$ or $R_3$ are hydrogen) or are quaternary (i.e. none of $R_1$, $R_2$ or $R_3$ are hydrogen).

Preferred di-alkoxylated ammonium salts for the compositions, nanocomposites, and processes of this invention can be represented as follows:

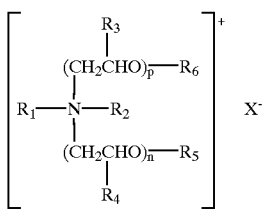

wherein N represents nitrogen; X$^-$ represents an anion which is preferably a halide atom such as chloride or bromide; $R_1$ and $R_2$ may be the same or different and are organic or oligomeric ligands comprising 1 to 30 carbon atoms, or may be hydrogen; p and n are at least 1 and can be the same or different; and $R_3$, $R_4$, $R_5$ and $R_6$ may be same or different and are hydrogen or hydrocarbons comprising 1 to 4 carbon atoms. Examples of useful di-alkoxylated ammonium cations include, but are not limited to bis(1-hydroxymethyl), octadecyl ammonium (having a hydrogen attached to nitrogen); bis(2-hydroxyethyl), octadecyl, methyl ammonium; octadecyl, isopropoxy, dimethyl ammonium; and the like or a mixture thereof.

Preferably, $R_1$ and $R_2$ are organic ligands. Preferred di-alkoxylated ammonium cations are tertiary (i.e. only one of $R_1$ or $R_2$ are hydrogen) or are quartenary (i.e. neither $R_1$ or $R_2$ are hydrogen). Preferred di-alkoxylated ammonium cations within this class have at least one hydroxyalkyl residue (i.e. at least one of $R_5$ or $R_6$ are hydrogen). Even more preferred di-alkoxylated ammonium cations within this class are tertiary or quarterary, and have two hydroxyalkyl ligands (i.e. $R_1$ and $R_2$ are not hydrogen, and $R_5$ and $R_6$ are hydrogen).

Useful tri-alkoxylated ammonium salts for the compositions, nanocomposites, and processes of this invention can be represented as follows:

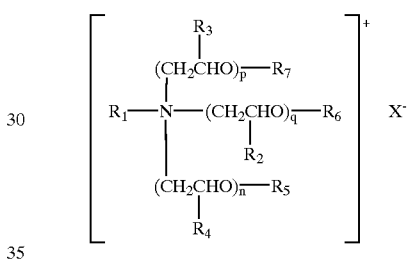

wherein N represents nitrogen; X$^-$ represents an anion which is preferably a halide such as chloride or bromide; $R_1$ is an organic or oligomeric ligand comprising 1 to 30 carbon atoms, or may be hydrogen; n, p, and q are at least 1 and can be the same or different; and $R_2$, $R_3$, $R_4$, $R_5$, $R_6$ and $R_7$ may be the same or different and are hydrocarbons comprising 1 to 4 carbon atoms or hydrogen. Preferably, $R_1$ and $R_2$ are not oligomeric. One of ordinary skill in the art will recognize that tri-alkoxylated ammonium salts are inherently at least tertiary, and will be quaternary if $R_1$ is not hydrogen.

Useful tetra-alkoxylated ammonium salts for the nanocomposite and process of this invention can be represented as follows:

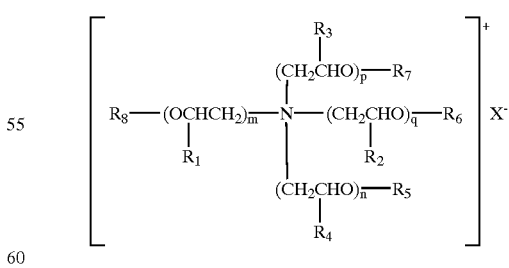

wherein N represents nitrogen; X$^-$ represents an anion which is preferably a halide atom such as chloride or bromide; m, n, p, and q are at least 1 and can be the same or different; and $R_1$, $R_2$, $R_3$, $R_4$, $R_5$, $R_6$, $R_7$ and $R_8$ may be the same or different and are hydrocarbons comprising 1 to 4 carbon atoms or hydrogen.

Certain preferred alkoxylated ammonium salts for the compositions, nanocomposites and process of this invention is a di-ethoxylated ammonium salt represented as follows:

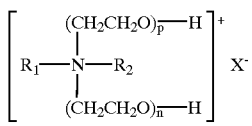

wherein N represents nitrogen; X⁻ represents an anion which is preferably a halide atom such as chloride or bromide; $R_1$ is an organic or oligomeric ligand comprising at least 8 carbon atoms; $R_2$ is hydrogen or an organic and oligomeric ligand comprising at least 8 carbon atoms; and p and n are at least 1 and can be the same or different. Preferably, $R_1$ and $R_2$ are not oligomeric. Preferably, only one of $R_1$ and $R_2$ is hydrogen (i.e. the cation is tertiary), or neither $R_1$ or $R_2$ is hydrogen (i.e. the cation is quaternary).

Even more preferably, N represents nitrogen; $R_1$ is an organic ligand comprising from 1 to 30 carbon atoms; $R_2$ is hydrogen or an organic ligand from 1 to 4 carbon atoms; and p and n are at least 1 and can be the same or different. Particularly preferably, $R_2$ is an organic ligand (i.e. the cation is quaternary).

Illustrative examples of suitable di-ethoxylated ammonium salts include those available under the trade name ETHOQUAD or ETHOMEEN from Akzo Chemie America, Chicago Ill., namely, ETHOQUAD 18/25, which is octadecyl methyl bis(polyoxyethylene[15]) ammonium chloride and ETHOMEEN 18/25, which is octadecyl bis (polyoxyethylene[15])amine, wherein the numbers in brackets refer to the total number of ethylene oxide units. The most preferred alkoxylated ammonium cations are octadecyl methyl bis(2-hydroxyethyl) ammonium and methyl bis(2-hydroxyethyl) tallow ammonium.

One of ordinary skill in the art will recognize that tallow is a mixture of materials derived from the treatment of animal fats, principally comprising a 50% majority mixture of chemical compounds having saturated and unsaturated $C_{18}$ alkyl groups also comprising smaller amounts of other alkyl groups, including $C_{16}$ alkyl groups. Tallow may be treated to remove any unsaturated groups, to generate hydrogenated tallow. It is to be understood that a reference to "tallow" includes "hydrogenated tallow" unless otherwise specifically indicated herein.

In some embodiments of the di-ethoxylated ammonium salts and/or cations of the invention, p and n are integers and the sum of p+n is greater than two. In other embodiments, either $R_1$ or $R_2$ or both are independently from each other a C2–C30 organic ligand. In yet other embodiments, $R_1$ or $R_2$ do not comprise a tallow residue or an octadecyl residue.

Mixtures of the above-described alkoxylated onium compounds may be used to treat, modify, and/or intercalate the layered clay materials of the invention. Moreover, the alkoxylated onium compounds may be further mixed with non-alkoxylated onium compounds, and the mixtures used to treat layered clay materials. Useful non-alkoxylated onium salts that may be employed in the mixtures, or employed for additional treatments of the layered clay materials can be represented as follows:

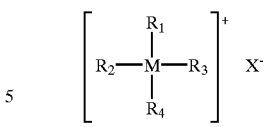

wherein M represents nitrogen or phosphorous; X⁻ represents an anion, preferably a halide atom such as chloride or bromide; $R_1$, $R_2$, $R_3$ and $R_4$ are independently selected from organic and oligomeric ligands having 1 to 30 carbon atoms, or may be hydrogen.

Modified or Treated Clays

Numerous methods to modify and/or intercalate layered clay materials with alkoxylated onium and/or ammonium compounds are known, and any of these methods may be used in this invention.

One embodiment of this invention is the treatment, modification or intercalation of at least one layered clay material with an at least one ammonium compound by the process of dispersing the layered clay material(s) in hot water, most preferably from 50 to 80° C., adding (neat or dissolved in water or alcohol) an organic onium salt, ammonium salt, or an organic amine and a Bronsted acid (thereby forming the organic onium salt in situ) or their combinations and mixtures with agitation. The mixture is blended for a period of time sufficient for the organic onium cations to exchange most of the metal cations present in the galleries between the layers of the layered clay material.

It is desirable to use a sufficient amount of the organic ammonium salt to permit exchange of most of the metal cations in the galleries of the layered particle for organic cations; therefore, at least about 0.5 equivalent of organic cation salt is used and up to about 3 equivalents of organic cation salt can be used. It is preferred that about 0.5 to 2 equivalents of organic cation salt be used, more preferable about 1.0 to 1.5 equivalents. It is often desirable, but not required, to remove most of the metal cation salt and most of the excess organic cation salt by washing and by other techniques known in the art.

Many additional useful clay treatments are known in the art, and these treatments may also be used before, during, or after treatment with the alkoxylated onium compound without deviating from the scope of this invention. Examples of useful treatments include, but are not limited to treatments with silane compounds, expanding agents, oligomeric polymers, dispersing aids, and other organic cation salts.

Many dispersing aids are known, covering a wide range of materials including water, alcohols, ketones, aldehydes, chlorinated solvents, hydrocarbon solvents, aromatic solvents, and the like or combinations thereof.

It should be appreciated that on a total composition any basis dispersing aids and/or pretreatment compounds that are used may account for significant amount of the total composition, in some cases up to about 30 weight percent. While it is preferred to use as little dispersing aids and/or pretreatment compounds as possible, the amounts of dispersing aids and/or pretreatment compounds may be as much as about 9 times the amount of the platelet particles. Once the layered clay materials have been treated with the alkoxylated compounds of the invention, and any other of the additional clay treatments, the layered clay materials may be termed a "treated layered clay material" or an "organoclay."

The organically treated or modified layered silicate material (organoclay) is isolated by methods known in the art including, but not limited to filtration, centrifugation, spray drying, and/or their combinations. Preferably, the particle size of the organoclay is then reduced in size by methods known in the art, including, but not limited to, grinding, pulverizing, hammer milling, jet milling, and their combinations. It is preferred that the average particle size be reduced to less than 100 microns in diameter, more preferably less than 50 microns in diameter, and most preferably less than 20 microns in diameter.

Processes for Forming Composites and Nanocomposites

Many processes to prepare polymer-clay composites or nanocomposites are known, and any of these processes may be used to prepare the composites and/or nanocomposites of the present invention. It is to be understood that the nanocomposites of the present invention represent highly dispersed and/or exfolliated forms of the platelet particles within the composite compositions of the invention. The composite compositions, which are part of the intended scope of the invention, need not always be in the highly dispersed or exfoliated form. Crude mixtures of the component parts of the compositions of the invention may be prepared, then subsequently converted to desirable nanocomposite form during final processing steps such as compounding, extrusion, molding, etc., as is described below.

Many processes for forming the composites and/or nanocomposites of the invention involve melting of the polyamide and mixing the molten polyarnide with the layered clay materials. The polyamide, the layered clay material, and the composites and/or nanocomposites produced by mixing are preferably melt processable, meaning that they are substantially thermally stable at or somewhat above the temperatures of the molten polyamides for the time of the required processing, so that there is not an unacceptable amount of chemical degradation or discoloration during melt processing. Melt processable materials must also have acceptable viscosity and other important physical properties at the temperature of the melts to allow melt processing. Preferred melt processible nanocomposites have rates of crystallization slow enough to permit production of optically clear preforms suitable for use in two-step blow molding processes.

Measurement of peak temperatures for crystallization on cooling ($T_{cc}$) and crystallization on heating ($T_{ch}$) for a polymer or composite composition by DSC is a useful tool for rapidly determining, qualitatively, the relative rates of crystallization of various polymers or composite compositions by comparison of $T_{cc}-T_{ch}$. The greater the value of $T_{cc}-T_{ch}$, the faster the material crystallizes. This method is useful for comparing composite compositions comprising the same matrix material. Therefore, preferred composition and/or nanocomposites of the invention may be identified by a test protocol to identify the compositions having a smaller value of $T_{cc}-T_{ch}$, as compared with the value of $T_{cc}-T_{ch}$ obtained from a corresponding composition prepared by substituting an non-alkoxylated ammonium cation, such as octadecyltrimethylammonium cation, for the alkoxylated ammonium cation.

In one embodiment of this invention, the melt mixing step is achieved by dry mixing polymer, preferably polyamide, with treated layered particles, then passing the mixture through a compounding extruder under conditions sufficient to melt the polymer.

Although any melt mixing device may be used, typically, the melt mixing step is conducted either by a batch mixing process or by a melt compounding extrusion process during which treated or untreated layered particles are introduced into a polyamide. Prior to melt mixing, the treated or untreated layered particles may exist in various forms including pellets, flakes, chips and powder. It is preferred that the treated or untreated layered particles be reduced in size by methods known in the art, such as hammer milling and jet milling. Prior to melt mixing, the polyamide may exist in wide variety of forms including pellets, ground chips, powder and molten.

In another embodiment of this invention, the melt-mixing step is conducted by feeding the polymer and treated or untreated layered particles separately into a compounding extruder. When treated layered clay particles are used in this process, it is usually preferred that the polymer be added first, to minimize degradation of treated layered clay particles. Use of extrusion compounding to mix the clay and the polymer is preferred because of the ease of preparation and the potential to attain high clay loadings.

If desired, a dispersing aid or expanding agent may be present during or prior to the formation of the composite by melt mixing for the purposes of aiding exfoliation of the treated swellable layered clay materials and/or particles into the polymer, to form nanocomposites. Many such dispersing aids are known, covering a wide range of materials including water, oligomeric polymers, water dispersible polymers, and organic compounds. Examples of suitable organic compounds include alcohols, ketones, aldehydes, chlorinated solvents, hydrocarbon solvents, aromatic solvents, and the like or combinations thereof. Examples of suitable water dispersible compounds include sulfonated polymers such as sulfonated polyesters and sulfonated polystyrene. The formation of a concentrate of the treated clay and an oligomeric polyamide, that may be the same or different from the matrix polymer, and that is then used to prepare the final nanocomposite is especially useful.

If desired, the compositions and/or nanocomposites of this invention may be treated before, during, or after their preparation for the purpose of increasing the molecular weight of the polyamides. Increasing the molecular weight of the polymer-platelet particle composite may be achieved by several different methods including, but not limited to reactive chain extension, solid state polymerization, crosslinking, and melt compounding with a high molecular weight, melt-processible polymer. Although not required, other fillers, additives, and reagents normally used in polymers may be incorporated into the nanocomposite. Useful additives and reagents include adhesive modifiers, oxygen scavenging catalysts, oxygen scavengers, toners, dyes, coloring agents, UV absorbers, mold release agents, recycling release aids, acetaldehyde reducing compounds, impact modifiers, antioxidants, stabilizers, flame retardants, reheat aids, crystallization aids, and their combinations. Useful fillers include glass fibers, glass beads, talc, carbon black, carbon fiber, titanium dioxide, and the like, or their combinations.

The amount of platelet particles in the composite or nanocomposite compositions are determined by measuring the amount of ash of the polymer-platelet particle compositions when treated in accordance with ASTM D5630-94. The gas barrier improvement generally increases with increasing concentration of platelet particles in the composite. While amounts of platelet particles as low as 0.01 percent provide improved barrier (especially when well dispersed and ordered), compositions having at least about 0.5 weight percent of the platelet particles are preferred because they display desirable improvements in gas permeability.

Without wishing to be bound by theory, it is believed that the improved gas barrier properties are related to beneficial interactions between the preferred layered clay materials of the invention and the alkoxylated onium cations of the invention. Improvements in gas barrier properties may be measured by a variety of methods. For example, improvements in gas barrier properties may be measured by comparison with the gas barrier properties obtained from a corresponding composition prepared by substituting octadecyltrimethylammonium cations for the alkoxylated ammonium cations of the invention.

Without being bound by any particular theory, it is believed that the degree of improved gas barrier properties observed in the composites of the invention depends upon the embodiment ratio of the resulting particle platelets and aggregates, the degree to which they are dispersed or uniformly distributed, and the degree to which they are ordered perpendicular to the flux of the permeant.

To obtain the improvements in gas permeability according to the present invention, it is preferable that the clay representative of the bulk of the composite be exfoliated, and preferably be highly exfoliated, in the matrix polymer such that the majority, preferably at least about 75 percent and perhaps as much as at least about 90 percent or more of the clay be dispersed in the form of individual platelet particles and aggregates having a thickness in the shortest dimension of less than about 20 nm and preferably less than about 10 nm, as estimated from TEM images. Polymer-clay nanocomposites containing more individual platelets and fewer aggregates, ordered or disordered, are most preferred. Significant levels of incomplete dispersion (i.e., the presence of large agglomerates and tactoids greater than about 20 nm) not only lead to an exponential reduction in the potential barrier improvements attributable to the platelet particles, but also can lead to deleterious affects to other properties inherent to polymer resins such as strength, toughness, and heat resistance.

Again, without being bound by a particular theory, it is believed that delamination of clay into platelet particles upon melt processing or mixing with a polymer requires favorable free energy of mixing, which has contributions from the enthalpy of mixing and the entropy of mixing. Melt processing clay with polymers results in a negative entropy of mixing due to the reduced number of conformations, which a polymer chain has when it resides in the region between two layers of clay. It is believed that poor dispersion is obtained using melt-processible polyesters, for example, because the enthalpy of mixing is not sufficient to overcome the negative entropy of mixing. In contrast, generally good dispersions are obtained with polyamides due to their hydrogen bonding character. However, the extent of this dispersion is frequently lessened because of the negative entropy of mixing.

Regarding the composite and/or nanocomposite compositions of the present invention, in a particular embodiment, the compositions or polymer nanocomposite material preferably comprises poly(m-xylene adipamide) (MXD6) and Wyoming-type montmorillonite and/or bentonite (clay) with a cation-exchange capacity of approximately 100 milliequivalents per hundred grams of clay. The clay is preferably treated with an alkoxylated ammonium compound, which is a tethered surfactant that promotes dispersion of the clay into the polyamide.

In one embodiment, the one or more polyamide polymers or copolymers comprises the polymerization reaction product of at least one diamine component, and at least one dicarboxylic acid component or dicarboxylic acid ester component; wherein the at least one dicarboxylic acid component or dicarboxylic acid ester component comprises a residue of phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, sebacic acid, a succinic acid, adipic acid, glutaric acid, azelaic acid, 1,3-phenylenedioxydiacetic acid, iminodiacetic acid, oxydiacetic acid, thiodiacetic acid, 1,4-phenylenedioxydiacetic acid, phenylindane dicarboxylic acid, or a mixture thereof and wherein the at least one diamine component comprises 1,2-ethylenediamine, 1,3-propylenediamine, 1,6-hexamethylenediamine, 1,12-dodecylenediamine, 1,4-cyclohexanebismethylamine, piperazine, p-xylylenediamine, m-xylylenediamine, or a mixture thereof, the one or more layered clay materials comprise one or more of a montmorillonite, a hectorite, a mica, a vermiculite, a bentonite, a nontronite, a beidellite, a volkonskoite, a saponite, a magadite, a kenyaite, or a mixture thereof, and the alkoxylated ammonium cation has the formula:

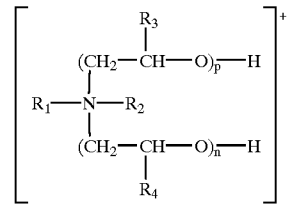

where $R_1$ and $R_2$ may be the same or different and are organic ligands comprising 1 to 30 carbon atoms or hydrogen; p and n are at least 1 and can be the same or different; and $R_3$ and $R_4$, may be the same or different and are hydrogen or hydrocarbons comprising from 1 to 4 carbon atoms; with the proviso that only one of $R_1$ or $R_2$ may simultaneously be hydrogen. In a still further embodiment, p and n are integers greater than one. Yet still further, either $R_1$ or $R_2$ or both is a $C_2$–$C_{30}$ organic ligand. In a still further embodiment, either $R_1$ or $R_2$ or both is a $C_1$–$C_{16}$ or $C_{20}$–$C_{30}$ organic ligand, and p and n are integers greater than one.

In a still further embodiment of the invention herein, the at least one dicarboxylic acid component or dicarboxylic acid ester component comprises an adipic acid residue; wherein the at least one diamine component comprises m-xylylenediamine; the layered clay material comprises a residue of one or more sodium bentonites, or one or more Wyoming type bentonites; and the alkoxylated ammonium cation is methyl octadecyl bis(2-hydroxyethyl) ammonium cation or methyl bis(2-hydroxyethyl) tallow ammonium cation. In a further embodiment, the at least one dicarboxylic acid component or dicarboxylic acid ester component comprises an adipic acid residue; the at least one diamine component comprises m-xylylenediamine; the layered clay material comprises a residue of one or more sodium bentonites, or one or more Wyoming type bentonites; and the alkoxylated ammonium cation is methyl octadecyl bis(2-hydroxyethyl) ammonium cation or methyl bis(2-hydroxyethyl) tallow ammonium cation.

Yet still further, the at least one dicarboxylic acid component or dicarboxylic acid ester component comprises an adipic acid residue; the at least one diamine component comprises m-xylylenediamine; the layered clay material comprises a residue of one or more sodium bentonites, or one or more Wyoming type bentonites; and the alkoxylated ammonium cation is not selected from the group consisting of methyl octadecyl bis(2-hydroxyethyl) ammonium cation or methyl bis(2-hydroxyethyl) tallow ammonium cation. In an additional embodiment, the at least one dicarboxylic acid component or dicarboxylic acid ester component comprises an adipic acid residue; the at least one diamine component comprises m-xylylenediamine; the alkoxylated ammonium cation is methyl octadecyl bis(2-hydroxyethyl) ammonium cation or methyl bis(2-hydroxyethyl) tallow ammonium cation; and the layered clay material does not comprise a residue of one or more sodium bentonites, or one or one more Wyoming type bentonites. In a still further embodiment, the at least one dicarboxylic acid component or dicarboxylic acid ester component comprises an adipic acid residue; the at least one diamine component comprises m-xylylenediamine; the layered clay material comprises a residue of one or more sodium bentonites, or one or more Wyoming type bentonites; and the alkoxylated ammonium cation is not selected from the group consisting of methyl octadecyl bis(2-hydroxyethyl) ammonium cation or methyl bis(2-hydroxyethyl) tallow ammonium cation. Still further, the polyamide polymer or copolymer is not poly(m-xylylene adipamide).

In yet a further embodiment, the alkoxylated ammonium cation is not methyl octadecyl bis(2-hydroxyethyl) ammonium cation. Still further, the alkoxylated ammonium cation is not methyl bis(2-hydroxyethyl) tallow ammonium cation.

In other embodiments, the alkoxylated ammonium cation is not methyl bis(2-hydroxyethyl) tallow ammonium cation or methyl octadecyl bis(2-hydroxyethyl) ammonium cation, and the layered clay material is not a residue of one or more sodium bentonites, or one or more Wyoming type bentonites.

In yet other embodiments, the alkoxylated ammonium cation is not methyl bis(2-hydroxyethyl) tallow ammonium cation or methyl octadecyl bis(2-hydroxyethyl) ammonium cation; the layered clay material is not a residue of one or more sodium bentonites, or one or more Wyoming type bentonites; and the polyamide polymer or copolymer is not poly(m-xylylene adipamide).

Ethoxylated alkyl ammonium compounds, particularly bis(2-ethoxy)methyloctadecyl ammonium, are preferred as the tethered surfactants employed to promote dispersion into the polyamide matrix. With their excellent dispersion, these organoclays (or intercalates) also enhance the melt strength of the polyamide. Moreover, the crystallization rate of these nanocomposites is also very similar to that of MXD6 polyamide, allowing considerable flexibility and short cycle times when melt processing in combination with PET or other polymers.

Bis(2-ethoxy)methyl octadecyl ammonium is a synonym for octadecylmethylbis(2-hydroxyethyl) ammonium, which is a major cationic component of tallowmethylbis(2-hydroxyethyl) and/or (hydrogenated tallow) methyl bis(2-hydroxyethyl) ammonium salts and compounds. It is also to be understood that the verbal order of the four substituents listed for an ammonium ion or compound is of no physical or chemical significance, for the purposes of this disclosure.

In one embodiment the composite compositions comprise SCPX-1578 organomontmorillonite clay purchased from Southern Clay Products (Gonzalez, Tex.). In yet a further embodiment, the composite compositions do not comprise SCPX-1578 organomontmorillonite clay.

Articles

This invention also relates to articles prepared from the nanocomposite compositions of this invention, including, but not limited to film, sheet, pipes, tubes, profiles, molded articles, preforms, stretch blow molded containers, injection blow molded containers, extrusion blow molded containers, thermoformed articles, and the like. The containers are preferably bottles. The bottles and containers of this invention provide increased shelf storage life for contents, including beverages and food that are sensitive to the permeation of gases. Articles, more preferably containers and bottles, of the present invention display a gas transmission or permeability rate (oxygen, carbon dioxide, water vapor) at least 10% lower (depending on clay concentration) than that of similar containers made from clay-free polymer, resulting in correspondingly longer product shelf life provided by the container. Desirable values for the sidewall modulus and tensile strength may also be maintained.

The articles may also be multilayered. Preferably, the multilayered articles have a nanocomposite material disposed intermediate to other layers, although the nanocomposite may also be one layer of a two-layered article. In embodiments where the nanocomposite and its components are approved for food contact, the nanocomposite may form the food contact layer of the desired articles. In other embodiments it is preferred that the nanocomposite be in a layer other than the food contact layer.

The multilayer articles may also contain one or more layers of the nanocomposite composition of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. The preferred structural polymers are polyesters, such as polyethylene terephthalate and its copolymers.

In another embodiment of this invention, the polymer-clay compositions and/or nanocomposites and the molded article or extruded sheet may be formed at the same time by co-injection molding or co-extruding with another polymer.

Another embodiment of this invention is the combined use of silicate layers uniformly dispersed in the matrix of a high barrier thermoplastic together with the multilayer approach to packaging materials. By using a layered clay to decrease the gas permeability in the high barrier layer, the amount of this material that is needed to generate a specific barrier level in the end application is greatly reduced. Since the high barrier material is often the most expensive component in multilayer packaging, a reduction in the amount of this material needed can be quite beneficial. With the nanocomposite layer being sandwiched between two outer polymer layers, the surface roughness is often considerably less than for a monolayer nanocomposite material. Thus, with a multilayer approach, the level of haze is reduced.

In applications such as extrusion blow molding, often a thermoplastic resin possesses insufficient melt strength for processing. In this invention, combinations of layered clay materials such as Wyoming-type clays with alkoxylated ammonium cations, particularly tertiary or quaternary alkoxylated ammonium cation as processing additives have increased the melt viscosity of the polyamides at low shear rates. Unexpectedly, at higher shear rates, the melt viscosity of the same composite material is considerably less, resulting in a high melt strength, processible material. Unexpectedly, the nanocomposite compositions of the invention containing only about 3 weight percent of the clay were observed to exhibit a drop in melt viscosity from almost 50,000 to less than 10,000 poise with a change in shear rate from 1 to 100 radians/second. Such shear-sensitive melt flow characteristics can be highly beneficial in blow molding applications, especially for blow molding hollow articles such as bottles. An unexpected further advantage observed for the composite compositions of the invention was improved constancy in melt viscosity with changing melt temperature. This effect may help in matching the melt viscosity values and thus the resulting morphology for two materials being processed together.

As stated above, in one embodiment of this invention, the polyamide-platelet particle nanocomposite composition and the molded article or extruded sheet may be formed at the same time by co-injection molding or co-extruding.

In forming stretch blow molded bottles of one or several layers, it is often customary to initially form a preform of the desired vessel or container via an injection molding process. The crystallization rate of the materials comprising the preform must be sufficiently slow to allow the formation of an essentially optically clear, noncrystalline preform. Unless the preform is essentially noncrystalline, it is exceedingly difficult to stretch blow mold into the desired shape to form a bottle. Prior art nanocomposite materials comprising polyamides and platelet particles typically exhibited fast rates of cystall and therefore produced crystalline preforms that are exceedingly difficult to blow mold. In a key embodiment of this invention, the layered silicate materials and treatment compounds are selected to promote dispersion of the individual platelets into the polymer to allow maximum barrier enhancement, minimum haze formation, and the formation of optically clear preforms by injection molding, which are essentially noncrystalline in character. Unexpectedly, the compositions and nanocomposites of the present invention allow the formation of optically clear, essentially non-crystalline preforms that are readily blow-moldable.

It is also to be understood that the characteristics and performance of the composite and/or nanocomposite compositions disclosed herein may optionally be modified by the use of layered clay materials having low quartz content, as disclosed in a co-pending U.S. patent application entitled "A Polymer Nanocomposite Comprising a Matrix Polymer and A Layered Clay Material Having a Low Quartz Content", applicant docket number 05015.0302, filed May 30, 2000. The composite and/or nanocomposite compositions disclosed herein may also be modified by the use of oligomer resins, as disclosed in co-pending U.S. patent application Ser. No. 09/354205, filed Jul. 15, 1999 and entitled "Process for Preparing An Exfoliated, High I.V. Polymer Nanocomposite With An Oligomer Resin Precursor and An Article Produced Therefrom". Both of the aforesaid patent applications are hereby incorporated herein by reference, in their entirety for the purpose of disclosing the compositions and methods described therein.

EXAMPLES

The following examples are put forth so as to provide those of ordinary skill in the art with a more complete disclosure and description of how the compositions claimed herein are made and evaluated. They are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in C or is at room temperature and pressure is at or near atmospheric.

Example 1

A low molecular weight m-xyladipamide polyamide was prepared as described in U.S. Pat. No. 5,340,884. This material was analyzed by titration of the amine and carboxylate end groups to possess a number average molecular weight of about 3,000, and was determined to have an I.V. of about 0.41 dL/g. A dry mixture was formed comprised of approximately 82% of the oligomeric poly(m-xylyladipoyl diamine) was dry mixed with 18 wt. percent of BY-ODBEMA organomontmorillonite clay, a Wyoming-type clay with a tethered surfactant of methyl octadecyl bis(2-hydroxyethyl) ammonium, provided by Nanocor Inc. The mixture was dried at 110° C. overnight in a vacuum oven then extruded on the Leistritz Micro 18 extruder equipped with general compounding screws. The AccuRate pellet feeder was set at a rate of approximately 2 kg/hr with a nitrogen atmosphere over both the feeder and the hopper. The barrel and die temperatures were set at 280° C. and the screw RPM at approximately 275. MXD6 6007, poly(m-xylylene adipamide) with an I.V. of about 1.1 dL/g, was purchased from Mitsubishi Chemical. The extrudate was ground and dry mixed in approximately a 1:3 ratio with the MXD6 6007. The clay loading of the extrudate was determined by ash analysis to be 3.7% (ASTM D5630-94).

The material obtained was then characterized by optical microscopy (OM) and transmission electron microscopy (TEM) to determine the degree of dispersion of the organoclay into the polymer matrix and to assess the morphology of the composite material. By optical microscopy, it is determined that the composite material exhibits a high degree of clarity, indicating that most of the organoclay is well distributed into the matrix of the polymer. The transmission electron micrographs verified that in most cases each of the clay layers is exfoliated, i.e. individually dispersed in the polymer matrix.

The X-ray intensity decreases monotonically throughout the entire range of the diffraction angle, $\theta$ from 1.5° to 10°. When this material was analyzed by ashing, 3.7% of the original weight was obtained.

This material was injection molded into a trilayer preform with PET and then stretch blow molded into a bottle. Analysis of the oxygen permeability of the barrier layer of the bottle sidewall yielded a value of 0.020 cc mil/100 $in^2$—24 hr.—atm., more than ten times higher barrier than the MXD6 control (0.3 cc mil/100 $in^2$—24 hr.—atm.).

Example 2

The procedure of Example 1 was repeated using a commercial Wyoming-type montmorillonite with a tethered surfactant of methyl octadecyl bis(2-hydroxyethyl)-ammonium. The morphology of this material was assessed microscopically in a manner similar to that described in Example 1. By optical microscopy, a high degree of clay dispersion was observed for the composite material. The transmission electron micrographs verified that in most cases each of the clay layers is exfoliated. In addition, the degree of dispersion of the organoclay into the polymer matrix was characterized by wide angle X-ray diffraction (WAXD). The WAXD analysis was carried out on a ground sample of the material using an X-ray diffractometer equipped with a Cu K$\alpha$ X-ray source. The diffraction profile from the organoclay exhibits a diffraction maximum corresponding to a basal spacing value of 1.8 nm. For the nanocomposite material, no diffraction maximum is exhibited in the WAXD profile. The X-ray intensity decreases monotonically throughout the entire angular range of the diffraction angle, $\theta$ from 1.5° to 10°. The crystallization characteristics of this material were analyzed using differential scanning calorimetry.

The pellets of this material were forwarded to two plastics processing firms for the injection molding of trilayer preforms and the subsequent stretch blow molding into bottles. The oxygen permeability of the bottle sidewall was determined on the Mocon Ox-tran 2/20 oxygen permeability tester. The oxygen permeability of the barrier layer of the bottle sidewall was measured at 0.020 cc mil/100 in$^2$—24 hr.—atm. and 0.06 020 cc mil/100 in$^2$—24 hr.—atm. Bottle controls were prepared containing MXD6 6007 as the barrier layer. The oxygen permeability of the sidewall barrier materials in these bottles was approximately 0.3 cc mil/100 in$^2$—24 hr.—atm.

Example 3

The procedure of Example 2 was repeated, with a lesser amount of composite employed that was comprised of the oligomer polyamide and the layered clay. In this example the initial extrudate was dry mixed in approximately a 1:6 ratio with the MXD6 6007. The clay loading of the extrudate was determined by ash analysis to be 1.8%. The morphology of this material was assessed in a manner similar to that described in Example 1. By optical microscopy, a high degree of clay dispersion was observed for the composite material. The transmission electron micrographs verified that in most cases the clay layers are individually exfoliated into the MXD6 matrix. The X-ray intensity decreases monotonically throughout the entire angular range of the diffraction angle, θ from 1.5° to 10°. The crystallization characteristics of this material were analyzed using differential scanning calorimetry (Table 2).

Example 4

MXD6 6007 was dry mixed with 3.8 wt. percent of BY-Q182 organomontmorillonite clay. The mixture was dried at 110° C. overnight in a vacuum oven then extruded on the Leistritz Micro 18 extruder equipped with a general compounding screw. The AccuRate pellet feeder was set at a rate of approximately 2 kg/hr with a nitrogen atmosphere over both the feeder and the hopper. The barrel and die temperatures were set at 270° C. and the screw RPM at approximately 275.

The material obtained was then characterized by optical microscopy (OM) and transmission electron microscopy (TEM) to determine the degree of dispersion of the organoclay into the polymer matrix and to assess the morphology of the composite material. By optical microscopy, it is determined that the composite material exhibits a high degree of clarity, indicating that most of the organoclay is well distributed into the matrix of the polymer. The transmission electron micrographs verified that in most cases each of the clay layers is exfoliated, i.e. individually dispersed in the polymer matrix. The crystallization characteristics of this material were analyzed using differential scanning calorimetry (Table 2).

A film was formed from the nanocomposite material by compression molding on a hydraulic press at 280° C. followed by immediate quenching in ice water to minimize crystallization on cooling. The oxygen barrier of the film was then determined on a Mocon 2/20 oxygen permeability tester to be 0.014 cc mil/100 in$^2$—24 hr.—atm.

This material was injection molded into a trilayer preform with PET and then stretch blow molded into a bottle. The oxygen permeability was determined on the Mocon 2/20 to be 0.08 cc mil/100 in$^2$—24 hr.—atm.

Comparative Example 1

The procedure of Example 1 was repeated using octadecylammonium (ODA) as the tethered surfactant for the clay employed. The crystallization characteristics of this material, analyzed using differential scanning calorimetry, are presented in Table 2.

Comparative Example 2

The procedure of Example 2 was repeated using trimethyloctadecylammonium (ODTMA) as the tethered surfactant for the clay employed. The oxygen permeability of compression molded film of this nanocomposite material (at 3.2% ash) was characterized as 0.041 cc/100 in$^2$ 24 hr atm. The crystallization characteristics of this material, analyzed using differential scanning calorimetry, are presented in Table 2.

Comparative Example 3

The procedure of Example 1 was repeated using, as a silicate component, a montmorillonite with a tethered surfactant of bis(2-hydroxyethyl)methyloctadecylammonium (ODBEMA). The resulting composite material was characterized in a manner similar to that described in Example 1. Examination by optical microscopy revealed a low level of montmorillonite exfoliation into the polymer matrix. Characterization of the oxygen barrier of the composite material at 0.516 cc/100 in$^2$ 24 hr atm. indicated no improvement over MXD6. Since the silicate used was not a Wyoming-type montmorillonite, this may be the primary factor which limits the degree of dispersion of the organoclay into the polyamide. The crystallization of the MXD6 composite exhibited a $T_{cc}-T_{ch}=9°$ C., indicative of very good processibility.

Comparative Example 4

The procedure of Comparative Example 3 was repeated using octadecyl-ammonium (ODA) as the tethered surfactant for the clay employed. In addition, a lesser amount of composite employed which was comprised of the oligomer polyamide and the layered clay. In this example the initial extrudate was dry mixed in approximately a 1:6 ratio with the MXD6 6007. The crystallization characteristics of this material, analyzed using differential scanning calorimetry, are presented in Table 2.

Comparative Example 5

The procedure of Example 3 was repeated using trimethyloctadecylammonium (ODTMA) as the tethered surfactant for the clay employed. The crystallization characteristics of this material, analyzed using differential scanning calorimetry, are presented in Table 2.

Table 2 shows the observed values of $T_{cc}-T_{ch}$ for neat MXD6 and MXD6-platelet particle composites comprising Wyoming-type clays that have been treated with alkylammonium compounds. Although the nanocomposites (Comparative Examples 1, 2, and 5) have reduced oxygen permeability (improved oxygen barrier), they also have higher $T_{cc}-T_{ch}$ values, indicating more rapid crystallization. Also shown in Table 1 are the observed values of $T_{cc}-T_{ch}$ and oxygen permeability for selected MXD6-platelet particle composites comprising clays that have been treated with certain ethoxylated ammonium compounds. These nanocomposites (Examples 1–3 and Comparative Example 3) exhibit reduced $T_{cc}-T_{ch}$ values, indicating less rapid crystallization. Selected MXD6-platelet particle composites (Examples 1–3) in Table 2 comprising Wyoming-type clays that have been treated with certain ethoxylated ammonium compounds have significantly reduced oxygen permeability (improved barrier) and reduced $T_{cc}$–$T_{ch}$ values, indicating less rapid crystallization (better processability). In addition, when these composite materials are formed into the articles desired, the excellent dispersion of the clay into the polyamide matrix helps reduce the overall level of the visual haze.

TABLE 2

Calorimetric Data from Nanocomposite Materials

| Example | Clay | Tether | Ash % | $T_{cc2}$ (° C.) | $T_{ch2}$ (° C.) | $T_{cc}$ - $T_{ch}$ (° C.) |
|---|---|---|---|---|---|---|
| Example 1 | BY | ODBEMA | 3.7 | 161 | 153 | 8 |
| Comparative | BY | ODA | 3.9 | 155 | 138 | 17 |
| Example 2 | EM | ODBEMA | 3.6 | 163 | 155 | 8 |
| Comparative Example 2 | EM | ODTMA | 3.7 | 170 | 145 | 25 |
| Comparative Example 3 | CWC | ODBEMA | 3.3 | 164 | 155 | 9 |
| Comparative Example 4 | CWC | ODA | 1.6 | 168 | 137 | 31 |
| Example 3 | EM | ODBEMA | 1.8 | 168 | 149 | 19 |
| Comparative Example 5 | EM | ODTMA | 1.8 | 172 | 144 | 28 |
| Example 4 | BY | ODBEMA | 2.6 | 150 | 135 | 15 |
| MXD6-6007 | — | — | — | 152 | 156 | -4 |

Example 5

This example illustrates the preparation of an amorphous polyamide comprising 1,3-phenylenedioxydiacetic acid (PDA) with m-xylylenediamine (MX).

To a 500 ml round bottom flask equipped with a short distillation column, a stirrer, and a nitrogen inlet was added 67.8 grams (0.3 moles) of resorcinol bis(carboxymethyl) ether [(1,3-phenylenedioxy)diacetic acid], 40.8 grams (0.30 moles) m-xylylenediamine, and 75.0 (4.17 moles) of water. The flask was purged of any oxygen present by reducing the vacuum to 100 mm and bleeding in nitrogen three times. The flask was immersed in a Belmont metal bath at 130° C. and stirred at 100 RPM. After 18 minutes, 20 ml of water was trapped in a condensation receiver and the reaction mixture was a white solid. The stirrer was stopped and the temperature was increased to 220° C. After 8 minutes, the temperature set point was increased to 275° C. After 19 minutes, the temperature was 265° C., melting of the reaction mixture had begun and the stirrer was started at 25 RPM. 50 ml of water had been trapped in a condensation receiver. After 17 minutes, the temperature was 275° C., 2/3 of the reaction mixture had melted and 60 ml of water had been trapped in a condensation receiver. After 8 minutes, almost all of the white solid was melted, the stirrer was increased to 100 RPM and the temperature set point was increased to 280° C. 62 ml of water had been trapped in a condensation receiver. After 5 minutes, all white solid had melted and the temperature was at 280° C. These conditions were held for 28 minutes. The stirring was reduced to 25 RPM and held for 2 minutes. The heat was removed and the polyamide was allowed to cool, removed from the flask and ground to pass a 3-mm screen. Analytical results: I.V.=0.52 dL/g; Tg=96.7° C.; Color: L*=83.45, a*=0.72, b*=28.67; NMR confirmed the composition to be PDA(MX). Oxygen permeability of a compression molded film was 0.19 cc-ml/100 in²—day—atm

Example 6

Example 6 illustrates the preparation of a polyamide comprising 90 mol % 1,3-phenylenedioxydiacetic acid (PDA) and 20 mol % terephthalic acid (TPA) with m-xylylenediamine (MX).

61.02 grams (0.27 moles) of 1,3-phenylenedioxydiacetic acid, 4.98 grams (0.03 moles) of terephthalic acid, 40.8 grams (0.30 moles) m-xylylenediamine, and 75.0 g (4.17 moles) of water was added to a 500 ml round bottom flask equipped with a short distillation column, a stirrer, and a nitrogen inlet. The flask was immersed in a Belmont metal bath at 170° C. and stirred at 100 RPM. After 8 minutes, 35 ml of water was trapped in a condensation receiver and the reaction mixture was a white solid. The stirrer was stopped and the temperature was increased to 220° C. After 12 minutes, the temperature was increased to 275° C. and 52 ml of water was trapped in a condensation receiver. After 7 minutes, the temperature was 263° C., melting of the reaction mixture had begun and the stirrer was started at 25 RPM. 60 ml of water had been trapped in a condensation receiver. After 9 minutes, the temperature was 275° C. and 1/3 of the reaction mixture had melted and the stirrer was increased to 50 RPM. 70 ml of water had been trapped in a condensation receiver. After 9 minutes, almost all of the white solid was melted and the stirrer was increased to 100 RPM. 72 ml of water had been trapped in a condensation receiver. After 5 minutes, all the white solid had melted and the stirrer was reduced to 50 RPM. These conditions were held for 30 minutes.

The heat was removed and the polyamide was allowed to cool, removed from the flask and ground to pass a 3-mm screen. The analytical results were: I.V.=0.40 dL/g; $T_g$=101.1° C.; Color: L*=92.90, a*=3.22, b*=36.48. NMR confirmed the composition of PDA-10-TPA(MX).

Example 7

This example illustrates the preparation of an amorphous polyamide comprising 90 mole % of 1,3-phenylenedioxydiacetic acid (PDA) and 10 mole % of naphthalenedicarboxylic acid (NDA) with m-xylylenediamine (MX).

To a 500 ml round bottom flask equipped with a short distillation column, a stirrer, and a nitrogen inlet was added 61.02 grams (0.27 moles) of resorcinol bis(carboxymethyl) ether [(1,3-phenylenedioxy)diacetic acid], 6.48 grams (0.03 moles) of 2,6-naphthalenedicarboxylic acid, 40.8 grams (0.30 moles) m-xylylenediamine, and 75.0 (4.17 moles) of water. The flask was immersed in a Belmont metal bath at 170° C. and stirred at 100 RPM. After 10 minutes, the reaction mixture was a white solid and the stirrer was stopped. 22 ml of water had been trapped in a condensation receiver and the temperature set point was increased to 220° C. After 10 minutes, the temperature set point was increased to 275° C. and 40 ml of water had been collected in a condensation receiver. After 7 minutes, the temperature was 263° C., melting of the reaction mixture had begun and the stirrer was started at 25 RPM. 50 ml of water had been trapped in a condensation receiver. After 9 minutes, the temperature was 275° C. and 1/3 of the reaction mixture had melted. The stirring was increased to 50 RPM and 60 ml of water had been trapped in a condensation receiver. After 9 minutes, almost the entire white solid was melted and the stirring was increased to 100 RPM. 62 ml of water had been trapped in a condensation receiver. After 5 minutes, all the white solid had melted and the stirring was reduced to 50 RPM. These conditions were held for 30 minutes. The heat was removed and the polyamide was allowed to cool, removed from the flask and ground to pass a 3-mm screen. Analytical results: I.V.=0.39 dL/g; Tg=101.1° C.; Color: L*=82.41, a*=2.23, b*=36.62; NMR composition=PDA-10-NDA(MX).

Example 8

Example 8 illustrates the preparation of an amorphous polyamide comprising 82 mol % adipic acid (A) and 18 mol % isophthalic acid (IPA) with m-xylylenediamine (MX).

To a 500 ml round bottom flask equipped with a short distillation column, a stirrer, and a nitrogen inlet was added 46.72 grams (0.32 moles) of adipic acid, 13.28 grams (0.08 moles) of isophthalic acid, 55.5 grams (0.408 moles) of m-xylylenediamine, and 75.0 (4.17 moles) of water. The flask was immersed in a Belmont metal bath at 115° C. and stirred at 100 RPM. After 8 minutes, there was a clear melt with some white unmelts present. The stirring was increased to 200 RPM. These conditions were held for 18 minutes. The temperature set point was increased to 275° C. After 17 minutes, the bath temperature was 168° C., 40 ml of water had been trapped in a condensation receiver and the reaction mixture was a white solid. The stirrer was stopped. After 9 minutes, the bath temperature was 216° C., melting had begun and the stirrer was started at 25 RPM. After 8 minutes, the stirrer set point was increased to 100 RPM. After 11 minutes, the entire solid had melted and 70 ml of water was trapped in a condensation receiver. The stirrer set point was increased to 200 RPM and the bath temperature was 275° C. Vacuum was applied beginning at 300 mm of mercury with gradual reduction to a set point of 0.3 mm over a period of 5 minutes. The stirrer set point was reduced to 100 RPM. As the viscosity of the melt increased, stirring was gradually reduced over a period of 15 minutes to 25 RPM. After a total vacuum time of 20 minutes, vacuum was increased to atmosphere and the heat was removed. The polyamide was allowed to cool, removed from the flask and ground to pass a 3-mm screen. The analytical results were: I.V.=0.83 dL/g; $T_g$=104.1° C.; $T_m$=none; Color: L*=82.15, a*=−1.38, b*=24.15. NMR confirmed the composition of A-19-IPA (MX).

Example 9

Example 9 illustrates the preparation of a polyamide comprising 82 mol % adipic acid (A) and 18 mol % terephthalic acid (TPA) with m-xylylenediamine (MX).

46.72 grams (0.32 moles) of adipic acid, 13.28 grams (0.08 moles) of terephthalic acid, 55.5 grams (0.408 moles) of m-xylylenediamine, and 75.0 (4.17 moles) of water was added to a 500 ml round bottom flask equipped with a short distillation column, a stirrer, and a nitrogen inlet. The flask was immersed in a Belmont metal bath at 115° C. and stirred at 100 RPM. After 12 minutes, a white opaque liquid was present and the stirring was increased to 200 RPM. The conditions were held for 18 minutes. The temperature set point was increased to 275° C. After 13 minutes, the bath temperature was 164° C., 30 ml of water had been trapped in a condensation receiver and the reaction mixture was a white solid. The stirrer was stopped. After 10 minutes, the bath temperature was 275° C., melting had begun and the stirrer was started at 25 RPM. After 16 minutes, some melting had begun and the stirrer set point was increased to 100 RPM. After 7 minutes, the stirring was increased to 200 RPM. After 26 minutes, the entire solid had melted and 65 ml of water was trapped in a condensation receiver. Vacuum was applied beginning at 300 mm of mercury with gradual reduction to a set point of 0.3 mm over a period of 5 minutes. As the viscosity of the melt increased, the role of stirring was gradually reduced over a period of 13 minutes to 25 RPM. After a total vacuum time of 20 minutes, vacuum was increased to atmosphere and the heat was removed. The polyamide was allowed to cool, removed from the flask and ground to pass a 3-mm screen. The analytical results were: I.V.=0.80 dL/g; $T_g$=106.3° C.; $T_m$=none; Color: L*=83.49, a*=−2.49, b*=22.98. NMR composition=A-18-TPA(MX). Oxygen permeability on a compression molded film was 0.17 cc-mil/100 in²—day—atm.

Example 10

This example illustrates the preparation of an amorphous polyamide comprising 82 mole % of adipic acid (A) and 18 mole % of naphthalenedicarboxylic acid (NDA) with m-xylylenediamine (MX).

To a 500 ml round bottom flask equipped with a short distillation column, a stirrer, and a nitrogen inlet was added 46.72 grams (0.32 moles) of adipic acid, 17.28 grams (0.08 moles) of 2,6-naphthalenedicarboxylic acid, 55.5 grams (0.408 moles) of m-xylylenediamine, and 75.0 (4.17 moles) of water. The flask was immersed in a Belmont metal bath at 115° C. and stirred at 100 RPM. After 12 minutes, a white opaque liquid was present and the stirring was increased to 200 RPM. The conditions were held for 18 minutes. The temperature set point was increased to 275° C. After 13 minutes, the bath temperature was 164° C., 30 ml of water had been trapped in a condensation receiver and the reaction mixture was a white solid. The stirrer was stopped. After 10 minutes, the bath temperature was 275° C., melting had begun and the stirrer was started at 25 RPM. After 16 minutes, some melting had begun and the stirrer set point was increased to 100 RPM. After 7 minutes, the stirring was increased to 200 RPM. After 26 minutes the entire solid had melted and 65 ml of water was trapped in a condensation receiver. Vacuum was applied beginning at 300 mm of mercury with gradual reduction to a set point of 0.3 mm over a period of 5 minutes. As the viscosity of the melt increased, stirring was gradually reduced over a period of 13 minutes to 25 RPM. After a total vacuum time of 20 minutes, vacuum was increased to atmosphere and the heat was removed. The polyamide was allowed to cool, removed from the flask and ground to pass a 3-mm screen. The analytical results were: I.V.=0.80 dL/g; $T_g$=106.3° C.; $T_m$=none; Color: L*=83.49, a*=−2.49, b*=22.98; NMR=A-18-NDA(MX). Oxygen permeability on a compression molded film was 0.17 cc-mils/100 in²—day—atm.

Example 11

This example illustrates the preparation of an amorphous polyamide comprising 81 mole % of adipic acid (A) and 19 mole % of phenylindandicarboxylic acid (PIDA) with m-xylylenediamine (MX).

To a 500 ml round bottom flask equipped with a short distillation column, a stirrer, and a nitrogen inlet was added 46.72 grams (0.32 moles) of adipic acid, 25.76 grams (0.08 moles) of 2,6-phenylindandicarboxylic acid, 55.5 grams (0.408 moles) of m-xylylenediamine, and 75.0 (4.17 moles) of water. The flask was immersed in a Belmont metal bath at 115° C. and stirred at 25 RPM. After 14 minutes, foaming was present and the stirring was increased to 300 RPM. The conditions were held for 14 minutes and the temperature set point was increased to 140° C. After 9 minutes, the temperature set point was increased to 150° C. and 10 ml of water had been trapped in a condensation receiver. After 3 minutes, the bath temperature was increased to 160° C. and 12 ml had been trapped in a condensation receiver. After 3 minutes, the bath temperature was 275° C. and 15 ml had been trapped in a condensation receiver. After 6 minutes, the bath temperature was 198° C. and 21 ml had been trapped in a condensation receiver. Some slight foaming was still present. After 10 minutes, the bath temperature was 244° C. and 35 ml had been trapped in a condensation receiver. The reaction mix was a white thick paste and the stirring was reduced to 25 RPM. After 16 minutes, the bath temperature was 275° C. and the reaction mix was ½ melted. After 3 minutes, the reaction mix was ¾ melted and 66 ml had been trapped in a condensation receiver. After 5 minutes, the entire paste had melted and vacuum was applied beginning at 500 mm of mercury with gradual reduction to a set point of 0.3 mm over a period of 8 minutes. As the viscosity of the melt increased, stirring was gradually reduced over a period of 12 minutes to 25 RPM. After a total vacuum time of 20 minutes, vacuum was increased to atmosphere and the heat was removed. The polyamide was allowed to cool, removed from the flask and ground to pass a 3-mm screen. The analytical results were: I.V.=0.50 dL/g; $T_g$=109.6° C.; $T_m$=none; Color: L*=78.08, a*=−1.33, b*=19.26; NMR composition of=A-19-PIDA(MX).

Example 12

Example 12 illustrates the preparation of one embodiment of a polyamide-clay nanocomposite of this invention.

An amorphous copolyamide prepared as described in Example 9 (1,000 grams of A-20-IPA(MX) with an I.V. of about 0.91 dL/g), and an octadecylammonium ion-intercalated clay (29.0 grams of CWC-ODA) of Nanocor, Inc., were dry blended and then dried in a vacuum oven with a slight nitrogen sweep at about 75° C. for about 16 hours. The mixture was placed into an AccuRate feeder then extruded at a feed rate of about 3.8 kg/hr on a Leistritz Micro 18 corotating twin screw extruder equipped with a general compounding screw at about 300 RPM with the barrel and die temperatures set at 250° C. and vacuum ventilation. The extrudate was quenched into water then chopped as it exited the die, to give 807 grams of the copolyamide nanocomposite with I.V. of about 0.90 dL/g and having an ash value of about 1.9 weight percent. Analysis by DSC showed a minor melting endotherm of 0.4 cal/g at about 200° C. on the first scan and no melting endotherm was observed on the second scan after cooling at a rate of about 200° C./min.

Example 13

Example 13 illustrates the coextrusion of one embodiment of a polyamide-clay nanocomposite of this invention and poly(ethylene terephthalate) (PET).

The copolyamide nanocomposite from Example 8 (about 700 grams) was dried in a vacuum oven with a slight nitrogen sweep at about 75° C. for about 16 hours. PET 9921, of Eastman Chemical Company, was dried separately in a hopper drier at about 120° C. Then the copolyamide nanocomposite and the PET 9921 were co-extruded to form a tri-layer film with the copolyamide nanocomposite comprising the center layer with thickness of about 7.0 mils and with the PET 9921 comprising the two outside layers with a total film thickness of about 21 mils. Several 2-inch square pieces of the tri-layer film were biaxially oriented at a stretch ratio of 4×4 using a T. M. Long instrument.

The oriented film showed excellent color and clarity, with haze of about 0.6%, L* of about 94.6, a* of about −0.9, and b* of about 0.1. Analysis of the oriented film by optical microscopy revealed very few large particles and almost no voids. Oxygen permeability of the film was determined using a Mocon Oxatran 2/20 to be 0.48 cc-mil/100 in²—day—atm, which is significantly better than the control sample in Comparative Example 6, and is better than the polyamide nanocomposite in Comparative Example 7.

Comparative Example 6

The process of Example 13 as repeated except that clay-free MXD6 6007, available from Mitsubishi Gas and Chemical Company, was used instead of the copolyamide nanocomposite to give a tri-layer film with total thickness of about 20.5 mils and a center clay-free barrier layer thickness of about 6.0 mils, as extruded.

The oriented film showed good color but elevated haze, with haze of about 2.45%, L* of about 94.7, a* of about −0.09, and b* of about −0.1. Oxygen permeability of the film was determined using a Mocon Oxatran 2/20 to be 0.83 cc-mil/100in²—day—atm, significantly (0.35 cc-mil/100 in²—day—atm) higher than the film having the nanocomposite center layer of Example 5.

Comparative Example 7

The process of Example 12 as repeated except that MXD6 6007, of Mitsubishi Gas and Chemical Company, was used instead of the copolyamide prepared as described in Example 8.

The process of Example 6 as repeated except that (1) the MXD6 nanocomposite was used instead of the copolyamide nanocomposite and (2) PET 20261, of Eastman Chemical Company, was used instead of PET 9921. The tri-layer film had a total thickness of about 21 mils and a center MXD6 nanocomposite layer thickness of about 1.4 mils.

The oriented film showed elevated haze, with haze of about 2.5%. Analysis of the oriented film by optical microscopy revealed numerous large particles and a significant amount of voids. Oxygen permeability of the film was determined using a Mocon Oxatran 2/20 to be 2.81 cc-ml/100 in²day—atm.

Example 14

A low molecular weight amine terminated copolyamide is prepared as described in Example 8 except that an excess of the m-xylylenediamine is used, to provide a material with I.V. of about 0.3 dL/g. This material is then used in place of the high I.V. copolyamide in the process of Example 12. After the extrusion is complete, 100 grams of the extrudate pellets are dry-mixed with 300 grams of MXD6 6007 polyamide pellets, of Mitsubishi Gas and Chemical Company. The MXD6 polyamide possessed a molecular weight of $M_n$=10,000 g/mol, $M_w$=25,000 g/mol, and $M_z$=40,000 g/mol. The mixture is then extruded on the Leistritz extruder under the same conditions as used with the clay polymer mixture but at a feed rate of 2.0 to 2.5 kg/hour. The resulting copolyamide nanocomposite is found to provide tri-layer film with excellent appearance and oxygen barrier.

Example 15

The process of Example 8 was repeated except that an onium ion intercalated clay (29.0 grams of CWC-ODA) of Nanocor, Inc., was also charged to the flask prior to the addition of the m-xylylenediamine. The resulting copolyamide nanocomposite is found to provide tri-layer film with excellent appearance and oxygen barrier.

Example 16

Example 16 illustrates one embodiment of a nanocomposite of the present invention.

MXD6 6007, poly(m-xylylene adipamide) with an I.V. of about 1.1 dL/g, was purchased from Mitsubishi Chemical Co. The organo-montmorillonite clay (PGC-Q182) was provided by Nanocor Inc. of Arlington Heights, Ill. The clay has a quartz content of 0.33 wt % determined from X-ray diffraction method. Also, this organoclay has a Na⁺ content of 0.12 wt %, as determined by X-ray diffraction.

The organo-montmorillonite clay was prepared by onium ion exchanging Na-montmorillonite with bis(2- hydroxyethyl) octadecyl methyl ammonium chloride. The finished product was washed with alcohol/water mixture to remove excess surfactant then dried and milled. The tether on the clay is bis(2-hydroxyethyl) octadecyl methyl ammonium.

A low molecular weight poly(m-xylylene adipamide) polyamide was prepared as described in U.S. Pat. No. 5,340,884. This material was analyzed by titration of the amine and carboxylate end groups to possess a number average molecular weight of about 3,000, and was determined to have an I.V. of about 0.41 dL/g. 1421.8 grams of this oligomeric poly(m-xylylene adipamide) was dry mixed with 378.2 grams of organomontmorillonite clay from Nanocor, Inc. Prior to dry mixing, the individual components were dried at 80C under vacuum for 24 hours. The mixture was then extruded on the Leistritz Micro 18 co-rotating twin screw extruder equipped with a general compounding screw. The AccuRate pellet feeder was set at a rate of approximately 2 kg/hr with a nitrogen atmosphere over both the feeder and the hopper. The barrel and die temperatures were set at 240C and the screw RPM at approximately 200.

After the extrusion was complete, 1666.7 grams of the extrudate pellets are dry-mixed with 8333.3 grams of MXD6 6007 polyamide. The mixture was then extruded on the Werner-Pfleiderer 30 mm twin screw extruder at a processing temperature of 260C and a screw RPM of 300 at a feed rate of about 30 lb/hr. The final material was analyzed for ash content and it was determined to be 2.53%.

The resulting nanocomposite material, of this example 16 was used as the middle layer of co-injected trilayer preforms. The ash content of the resulting nanocomposite was 2.53%. The inner and outer layers of the trilayer preform were made from Eastman's amber colored PET 20261, having about 0.80 dL/g I.V. The nominal thickness of the middle layer was about 8% of the total thickness. The preforms were stretch blow molded on Sidel SBO 2/3 machine into 16 oz. beer bottle. The bottle sidewall was cut and the middle layer containing the nanocomposite material was peeled from the three-layer configuration, and analyzed for haze, oxygen permeability and optical microscopy.

The haze of the middle layer was 8%. The haze was determined by ASTM test method D-1003. The oxygen permeability of the sidewall barrier materials in these bottles was approximately 0.1 cc mil/100 in$^2$—24 hr.—atm.

Example 17

A low molecular weight oligomeric poly(m-xylylene adipamide) was prepared as described in U.S. Pat. No. 5,340,884. This material was analyzed by titration of the amine and carboxylate end groups to possess a number average molecular weight of about 3,000, and was determined to have an I.V. of about 0.41 dL/g. 306.4 grams of this oligomeric poly(m-xylylene adipamide) was dry mixed with 55 grams of SCPX-1578 organomontmorillonite clay purchased from Southern Clay Products (Gonzalez, Tex.) and then dried at 110° C. overnight in a vacuum oven. The mixture was then extruded on the Leistritz Micro 18 corotating twin screw extruder equipped with a general compounding screw. The AccuRate pellet feeder was set at a rate of approximately 2 kg/hr with a nitrogen atmosphere over both the feeder and the hopper. The barrel and die temperatures were set at 280° C. and the screw RPM at approximately 275. After the extrusion was complete, 100 grams of the extrudate pellets are dry-mixed with 300 grams of MXD6 6001 polyamide pellets purchased from Mitsubishi Chemical. The MXD6 polyamide possessed an I.V. of about 1.1 dL/g. The mixture was then extruded on the Leistritz extruder under the same conditions used with the clay polymer mixture but at a feed rate of 2.0 to 2.5 kg/hour.

The material obtained was then characterized by optical microscopy (OM), transmission electron microscopy (TEM) and by wide angle X-ray diffraction (WAXD) to determine the degree of dispersion of the organoclay into the polymer matrix and to assess the morphology of the composite material. The WAXD analysis was carried out on a ground sample of the material using an X-ray diffractometer equipped with a Cu Kα X-ray source. The diffraction profile from the organoclay exhibits a diffraction maximum corresponding to a basal spacing value of 1.8 nm. For the nanocomposite material, no diffraction maximum is exhibited in the WAXD profile. The X-ray intensity decreases monotonically throughout the entire angular range of the diffraction angle, θ from 1.5° to 10°. By optical microscopy it is determined that the composite material exhibits a high degree of clarity, indicating that most of the organoclay is well distributed into the matrix of the polymer. The transmission electron micrographs verified that, in most cases, each of the clay layers is exfoliated, i.e. individually dispersed in the polymer matrix.

A film was formed from the nanocomposite material by compression molding on a hydraulic press at 280° C. followed by immediate quenching in ice water to minimize crystallization on cooling. The oxygen barrier of the film was then determined on a Mocon 2/20 oxygen permeability tester to be 0.03 cc mil/100 in$^2$—24 hr.—atm.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A nanocomposite material comprising:

a. one or more polyamide polymers or copolymers comprising poly(m-xylylene adipamide), or poly(m-xylylene adipamide-co-isophthalamide), and b. one or more layered clay materials comprising a residue of a bentonite, or a residue of a montmorillonite, wherein the layered clay material comprises quaternary alkoxylated ammonium cations having the structure:

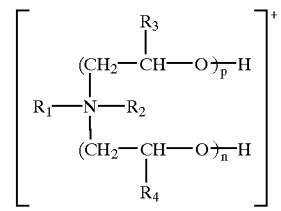

wherein $R_1$ and $R_2$ may be the same or different and are organic ligands comprising from 1 to 30 carbon atoms; p and n are integers of at least 1 and can be the same or different; and $R_3$ and $R_4$, may be the same or different and are hydrogen or hydrocarbons comprising from 1 to 4 carbon atoms.

2. The composition of claim 1, wherein at least one of $R_1$ or $R_2$ comprises a $C_1$–$C_4$ alkyl group, at least one of $R_1$ or $R_2$ comprises at least eight carbon atoms, and $R_3$ and $R_4$ are hydrogen.

3. The composition of claim 1, wherein the quaternary alkoxylated ammonium cation is methyl octadecyl bis(2-hydroxyethyl) ammonium cation or methyl bis(2-hydroxyethyl) tallow ammonium cation.

4. The composition of claim 1, wherein the bentonite is a Wyoming bentonite, or the montmorillonite is a Wyoming montmorillonite.

5. A process for preparing a composite composition comprising the steps of:
  a. treating a layered clay material with at least one ammonium salt comprising one or more alkoxylated ammonium cations wherein the cation is an ammonium cation of the formula:

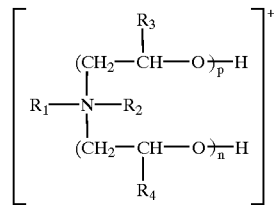

wherein $R_1$ and $R_2$ may be the same or different and are organic ligands comprising from 1 to 30 carbon atoms; p and n are at least 1 and can be the same or different; and $R_3$ and $R_4$, may be the same or different and are hydrogen or hydrocarbons comprising from 1 to 4 carbon atoms, thereby forming a treated layered clay material, and
  b. mixing the treated layered clay material with a polymer composition comprising at least one polyamide polymer or copolymer comprising poly(m-xylylene adipamide), poly(hexamethylene isophthalamide-co-terephthalamide), poly(m-xylylene adipamide-co-isophthalamide), or a mixture thereof.

6. The process of claim 5, wherein the mixing step comprises dispersing the treated layered clay material in the polymer composition to form a nanocomposite.

7. The process of claim 5, wherein the mixing step comprises melt processing the treated layered clay material with the polyamide polymer or copolymer.

8. The process of claim 5, wherein the at least one polyamide polymer or copolymer comprises a low molecular weight m-xylyladipamide polyamide having an I.V. from about 0.1 to about 0.5 dL/g.

9. The process of claim 5, wherein the quaternary alkoxylated ammonium cation is methyl octadecyl bis(2-hydroxyethyl) ammonium cation or methyl bis(2-hydroxyethyl) tallow ammonium cation.

10. The process of claim 5, wherein the quaternary alkoxylated ammonium cation is not methyl octadecyl bis(2-hydroxyethyl) ammonium cation or methyl bis(2-hydroxyethyl) tallow ammonium cation.

11. The process of claim 5, wherein the layered clay material comprises a residue of a montmorillonite, a residue of a bentonite, or a mixture thereof.

12. The process of claim 11, wherein the quaternary alkoxylated ammonium cation is octadecyl bis(2-hydroxyethyl) ammonium cation or methyl bis(2-hydroxyethyl) tallow ammonium cation.

13. The process of claim 5, wherein the polyamide polymer or copolymer is poly(m-xylylene adipamide).

14. The process of claim 5, further comprising molding the composite composition to form an article.

15. A polymer-clay nanocomposite having an improved gas permeability comprising:
  a. a melt-processable matrix polyamide comprising poly(m-xylylene adipamide), poly(hexamethylene isophthalamide-co-terephthalamide), poly(m-xylylene adipamide-co-isophthalamide), or a mixture thereof, and
  b. a layered clay material treated with an alkoxylated onium cation of the formula:

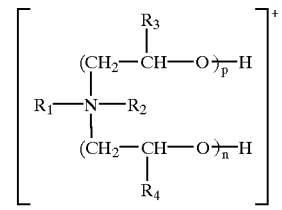

wherein $R_1$ and $R_2$ may be the same or different and are organic ligands comprising from 1 to 30 carbon atoms; p and n are at least 1 and can be the same or different; and $R_3$ and $R_4$, may be the same or different and are hydrogen or hydrocarbons comprising from 1 to 4 carbon atoms, wherein the treated clay material is incorporated into the matrix polymer.

16. The nanocomposite of claim 15, wherein the alkoxylated onium cation is derived from a di-ethoxylated ammonium salt represented as follows:

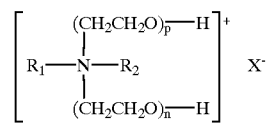 X⁻ wherein N represents nitrogen; X⁻ represents an anion which is preferably a halide atom such as chloride or bromide; $R_1$ is an organic or oligomeric ligand comprising at least 1 carbon atom; $R_2$ is hydrogen or an organic or oligomeric ligand comprising at least 8 carbon atoms; and p and n are at least 1 and can be the same or different.

17. The nanocomposite of claim 15, wherein the alkoxylated onium cation is octadecylmethylbis(2-hydroxyethyl) ammonium chloride or tallowmethylbis(2-hydroxyethyl) ammonium.

18. The nanocomposite of claim 15, wherein the layered clay material is a bentonite or montmorillonite.

19. The nanocomposite of claim 15, wherein:
  a. the melt-processable matrix polyamide comprises poly(m-xylylene adipamide), poly(hexamethylene isophthalamide-co-terephthalamide), or poly(m-xylylene adipamide-co-isophthalamide),
  b. the layered clay material is a bentonite or montmorillonite, and
  c. the alkoxylated onium cation is octadecyl, methyl, bis(2-hydroxyethyl) ammonium chloride or tallowmethylbis(2-hydroxyethyl) ammonium.

20. The nanocomposite of claim 15, wherein the melt-processible matrix polyamide has an I.V. from about 0.7 to about 0.9 dL/g.

21. The nanocomposite of claim 15, wherein the alkoxylated onium cation is represented as follows:

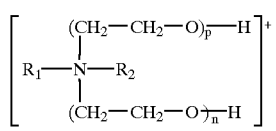

wherein N represents nitrogen; $R_1$ is an organic ligand comprising at least 1 carbon atom; $R_2$ is an organic ligand comprising at least 8 carbon atoms; and p and n are at least 1 and can be the same or different.

22. The nanocomposite of claim 15, further comprising a low molecular weight m-xylyladipamide polyamide having an I.V. from about 0.1 to about 0.5 dL/g.

23. A polymer-clay nanocomposite having an improved gas permeability comprising:

a. a melt-processible matrix polymer comprising poly(m-xylylene adipamide), poly(hexamethylene isophthalamide-co-terephthalamide), or poly(m-xylylene adipamide-co-isophthalamide), and b. a layered clay material comprising a bentonite or montmorillonite, treated with an alkoxylated onium cation comprising octadecylmethylbis(2-hydroxyethyl) ammonium chloride or tallowmethylbis(2-hydroxyethyl) ammonium, wherein treated clay material is incorporated into the matrix polymer.

* * * * *